(12) United States Patent
Tsurusaki et al.

(10) Patent No.: US 7,441,034 B2
(45) Date of Patent: Oct. 21, 2008

(54) COMMUNICATION DEVICE IMPLEMENTING A RETRANSMITTING FUNCTION, PROGRAM AND MEDIUM

(75) Inventors: Masaru Tsurusaki, Fukuoka (JP);
Tatsuya Tanoue, Fukuoka (JP);
Yoshiaki Kawakatsu, Fukuoka (JP);
Toshihiro Iyama, Fukuoka (JP);
Hidetoshi Kawakami, Fukuoka (JP);
Akihiro Sato, Fukuoka (JP); Ryouichi Motozono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 669 days.

(21) Appl. No.: 10/102,677

(22) Filed: Mar. 22, 2002

(65) Prior Publication Data
US 2003/0126288 A1 Jul. 3, 2003

(30) Foreign Application Priority Data
Dec. 28, 2001 (JP) .............................. 2001-399755

(51) Int. Cl.
*G06F 15/16* (2006.01)
(52) U.S. Cl. .................. 709/227; 709/204; 709/205; 709/206; 709/207; 379/133; 379/140; 455/417; 455/461; 455/462; 455/463
(58) Field of Classification Search ......... 709/204–207, 709/227; 455/418, 461–463, 417, 551; 379/140, 379/133
See application file for complete search history.

(56) References Cited

U.S. PATENT DOCUMENTS

| | | | | |
|---|---|---|---|---|
| 5,398,279 | A * | 3/1995 | Frain ........................... | 379/140 |
| 5,872,929 | A * | 2/1999 | Naito ........................... | 709/223 |
| 6,078,655 | A * | 6/2000 | Fahrer et al. ........... | 379/220.01 |
| 6,272,334 | B1 * | 8/2001 | Rao ........................... | 455/418 |
| 6,622,160 | B1 * | 9/2003 | Horvitz ........................ | 709/206 |
| 6,708,152 | B2 * | 3/2004 | Kivimaki .................... | 704/260 |
| 6,871,215 | B2 * | 3/2005 | Smith et al. ................ | 709/206 |

(Continued)

FOREIGN PATENT DOCUMENTS

DE 197 50 991 A 1 5/1999

(Continued)

OTHER PUBLICATIONS

Communication from the European Patent Office dated Dec. 16, 2002 including European Search Report.

(Continued)

*Primary Examiner*—Liangche A Wang
(74) *Attorney, Agent, or Firm*—Staas & Halsey LLP

(57) ABSTRACT

A communication device implementing a function of retransmitting to a destination includes an operation unit detecting an input operation, a communication module starting a transmission to a destination specified by the input operation, a storage unit storing one or more pieces of destination specifying information on every destination, a judging module judging whether the communication can be attained upon the transmission, a searching module searching for, if judged to be impossible of the communication, one or more pieces of destination specifying information stored corresponding to the destination from the storage unit, a display unit displaying a list of the searched destination specifying information, a selection module accepting a selection of a desired piece of destination specifying information from the list of the destination specifying information displayed, and a retransmitting module retransmitting based on the selected destination specifying information.

12 Claims, 18 Drawing Sheets

U.S. PATENT DOCUMENTS 6,879,824 B1 4/2005 Otsubo et al.
6,968,213 B1 11/2005 Inoue

FOREIGN PATENT DOCUMENTS

| EP | 0 991 250 A2 | 4/2000 |
| EP | 991250 A2 * | 4/2000 |
| EP | 1 130 884 A2 | 9/2001 |
| EP | 1 133 141 A1 | 9/2001 |
| JP | 02-141155 | 5/1990 |
| JP | 03-32255 | 5/1991 |
| JP | 11-252234 | 9/1999 |
| JP | 2000-106600 | 4/2000 |
| JP | 2001-103184 | 4/2001 |
| JP | 2001-523922 | 11/2001 |
| WO | 99/26391 | 5/1999 |

OTHER PUBLICATIONS

Japanese Office Action mailed Feb. 28, 2006 for Japanese Application No. 2001-399755.
USP6968213 (reference AA) corresponds with JP2000-106600 (reference AG).
USP6879824 (reference AB) corresponds with JP2001-103184 (reference AL).
Notice of Reason for Rejection mailed Jun. 6, 2006 issued in the corresponding Japanese Patent Application No. 2001-399755.

* cited by examiner

FIG. 4

| DIRECTORY NO. | 001 | 002 | ... | 999 |
|---|---|---|---|---|
| NAME | ICHIRO TANAKA | HANAKO TANAKA | | |
| TELEPHONE 1 | 090 12345678 | 090 98765432 | | |
| TELEPHONE 2 | 070 12345678 | 090 12345678 | | |
| TELEPHONE 3 | 03 1234 5678 | 044 123 4567 | | |
| TELEPHONE 4 | 044 123 4567 | 045 678 4567 | | |
| TELEPHONE 5 | 045 678 4567 | | | |
| MAIL 1 | ichiro@aaa.bbb.ccc | hanako@aaa.bbb.ccc | | |
| MAIL 2 | tanaka@abc.def.com | tana3@xxx.yyy.zzz | | |
| MAIL 3 | tana1@xxx.yyy.zzz | | | |
| GROUP | FRIEND | FRIEND | | |
| MEMORANDUM | | | | |

FIG. 10

| CALL RECEIVING HISTORY NUMBER | CALL RECEIVING DATE AND TIME | CALLER TELEPHONE NUMBER | CALLER NAME |
|---|---|---|---|
| 001 | 21:04:10, JAN. 24, 2001 | 090-12345678 | ICHIRO TANAKA |
| 002 | 22:55:11, JAN. 24, 2001 | 03-9999-9999 | JIRO YAMADA |
| ... | ... | ... | ... |

FIG. 13

| ANSWERING HISTORY RECORD NUMBER | RECORD COMPLETION DATE AND TIME | CALLER TELEPHONE NUMBER | CALLER NAME |
|---|---|---|---|
| 001 | 21:04:10, JAN. 24, 2001 | 090-12345678 | ICHIRO TANAKA |
| 002 | 22:55:11, JAN. 24, 2001 | 03-9999-9999 | JIRO YAMADA |
| ... | ... | ... | ... |

FIG. 15

| RECEIVED MAIL NUMBER | RECEIVING DATE AND TIME | SENDER E-MAIL ADDRESS | SENDER NAME |
|---|---|---|---|
| 001 | 21:04:10, JAN. 24, 2001 | tanaka@xxx.yyy.net | ICHIRO TANAKA |
| 002 | 22:55:11, JAN. 24, 2001 | yamada@xxx.or.jp | JIRO YAMADA |
| ... | ... | ... | ... |

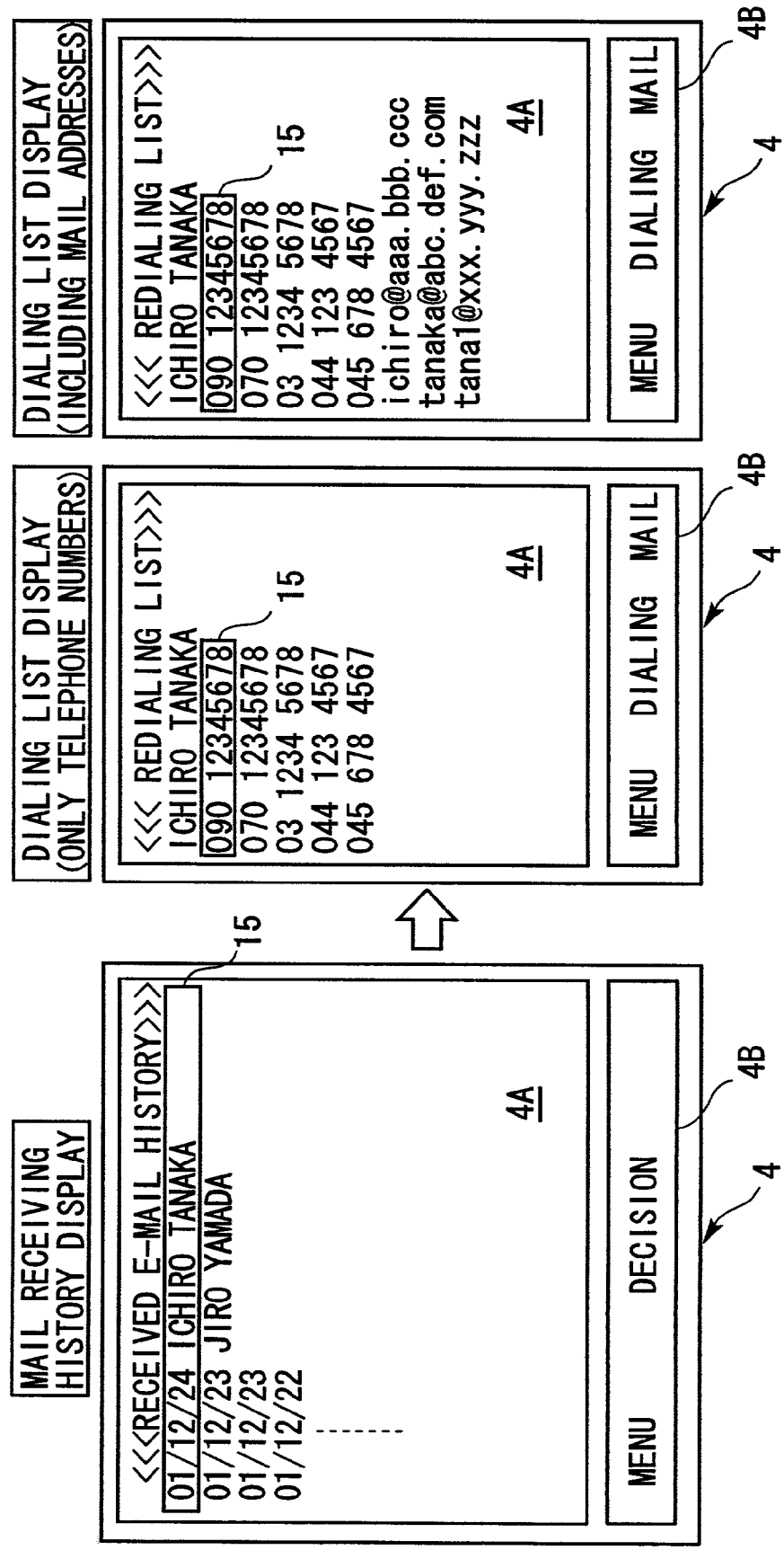

FIG. 17

| TELEPHONE DIRECTORY NO | 001 | 002 | ... | 999 |
|---|---|---|---|---|
| NAME | ICHIRO TANAKA | HANAKO TANAKA | | |
| TELEPHONE 1 | 090 12345678 | 090 98765432 | | |
| DIALING COUNT | 21 | 26 | | |
| TELEPHONE 2 | 070 12345678 | 090 12345678 | | |
| DIALING COUNT | 10 | 14 | | |
| TELEPHONE 3 | 03 1234 5678 | 044 123 4567 | | |
| DIALING COUNT | 5 | 7 | | |
| TELEPHONE 4 | 044 123 4567 | 045 678 4567 | | |
| DIALING COUNT | 2 | 3 | | |
| TELEPHONE 5 | 045 678 4567 | | | |
| DIALING COUNT | 0 | 1 | | |
| MAIL 1 | ichiro@aaa.bbb.ccc | hanako@aaa.bbb.ccc | | |
| DELIVERING COUNT | 15 | 17 | | |
| MAIL 2 | tanaka@abc.def.com | tana3@xxx.yyy.zzz | | |
| DELIVERING COUNT | 2 | 3 | | |
| MAIL 3 | tana1@xxx.yyy.zzz | | | |
| DELIVERING COUNT | 1 | 0 | | |
| GROUP | FRIEND | FRIEND | | |
| MEMORANDUM | | | | |

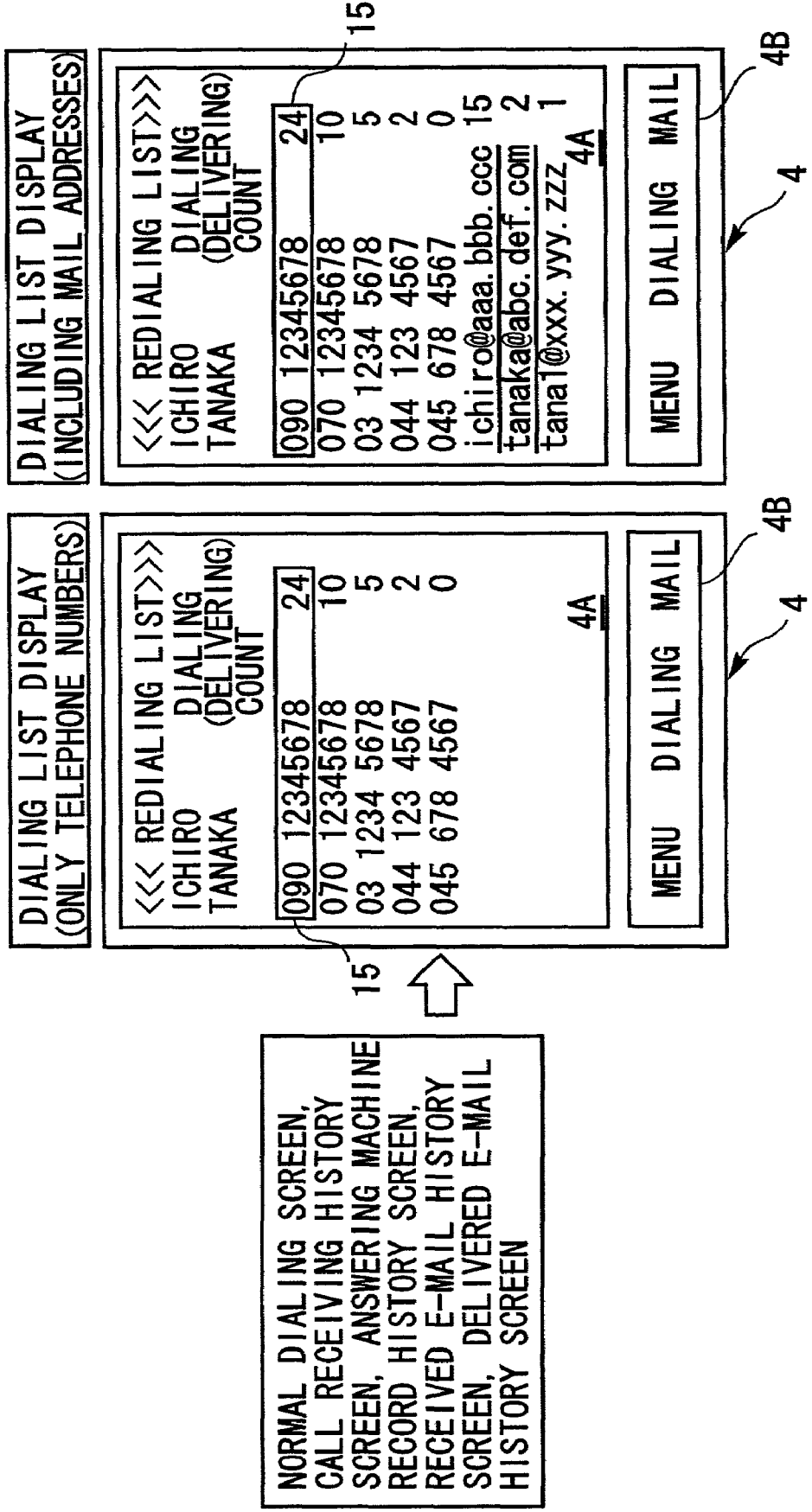

COMMUNICATION DEVICE IMPLEMENTING A RETRANSMITTING FUNCTION, PROGRAM AND MEDIUM

BACKGROUND OF THE INVENTION

The present invention relates to a function of dialing a telephone number of a telephone and delivering an E-mail.

Communicating with a person through a telephone or a computer having a communication function (which will hereinafter be expressed as a telephone etc) involves dialing a voice phone (that will hereinafter simply be called a telephoning), delivering an E-mail and so on. Generally when telephoning or delivering the E-mail, a database registered beforehand as a telephone directory in the telephone etc is utilized in the great majority of cases. The telephone etc containing the telephone directory described above is capable of searching for a telephone number or an E-mail address with a name of the callee (or a mail receiver) used as a key. Then, it is possible to dial the searched telephone number of a telephone of the callee or deliver the E-mail to the searched E-mail address of the receiver without key-inputting again the telephone number and the E-mail address.

Some of this type of telephone directories can be registered with a plurality of telephone numbers and a plurality of E-mail addresses with respect to a specified callee. Further, there is provided a function of storing the telephone etc with the telephone number of the telephone or the address of the E-mail that is received from a caller (or a mail sender), and dialing the telephone number of the caller or delivering to the E-mail address of the sender. If utilizing such a function, it is feasible to telephone back or deliver the E-mail back without using the telephone directory each time.

As a result of telephoning or delivering in the way described above, however, there might be a case where it is difficult to communicate with the callee. It might happen that the caller can not come to talk with a callee whom the caller desires to get contact with for a variety of reasons in which, for example, the callee is now using the very telephone, the line is congested, the callee is not within an immediate access to that telephone and so forth. Further, there might be case of being unable to speak under a proper environment, wherein the voice can not be clearly heard due to disturbed radio waves and so on.

In such a case, the telephone etc is stored with the telephone number and the E-mail address used for dialing and delivering, and a connection with the callee is repeatedly tried by use of the same number in a way that easily redials the above telephone number or redelivers a mail to the above E-mail address. An alternative scheme is to search for a number (different communication information) registered in the telephone directory and to transmit by use of this number.

For instance, even if unable to establish a conversation due to the disturbed radio waves on the mobile telephone when the callee is in the office or home, the office or home might be equipped with a fixed telephone. In such a case, the caller desires to redial a telephone number other than the telephone number that is now used but does not often remember it. Thus, if the callee has the plurality of telephone numbers, it follows that the caller inputs a name of the company and a name of the callee from the telephone directory described above, then searches for that telephone number and redial it.

The followings are operational examples:
1. Dial the telephone number.—No answer
→ 2. Disconnect.
→ 3. Redial the telephone number.—No answer
→ 4. Disconnect.
→ 5. The above telephone number is not connected, and hence the telephone directory is startted for dialing a different telephone number of the callee.
→ 6. "Search by name" is selected from a search menu of the telephone directory.
→ 7. Input the name of the callee.
→ 8. Select a desired telephone number to be dialed next from the plurality of callee's telephone numbers displayed.
→ 9. Dial the selected telephone number.

SUMMARY OF THE INVENTION

As described above, according to the conventional telephoning mode, if unable to speak to a target callee, the same telephone number has hitherto been redialed. Further, if not connected to this telephone number, the caller often tried to call up the callee by searching for a different telephone number of the same callee from the telephone directory. In such a case, the search for the telephone number and the redialing were complicated and time-consuming. For example, in the operational examples given above, the user needs the disconnecting operations shown in the items 2 and 4 through the search for the telephone directory shown in the items 5 through 7, and the time and labor required are burdens on the user.

Note that there has already been proposed a technology for automatically searching for a different telephone number of the callee and telephoning when redialing. According to this technology, however, the different telephone number is automatically selected and dialed, and therefore a problem is that a telephone number unintended by the caller is to be dialed.

Further, the same problem arises when the callee has a plurality of E-mail addresses. Namely, if unable to smoothly communicate by E-mail with the callee, there is no means for easily selecting one of the plurality of E-mail addresses of the callee.

Accordingly, it is a primary object of the present invention, which was devised in view of the problems inherent in the prior art, to provide a technology capable of easily communicating, based on a different piece of destination specifying information intended by a caller, with a destination callee having plural pieces of destination specifying information (e.g., telephone numbers and E-mail addresses) if difficult to communicate with the destination callee by use of one piece of destination specifying information.

To accomplish the above object, according to one aspect of the present invention, a communication device implementing a retransmitting function has an operation unit detecting an input operation, a communication module starting a transmission to a destination specified by the input operation, a storage unit storing one or more pieces of destination specifying information on every destination, a judging module judging whether the communication can be attained upon the transmission, a searching module searching for, if judged to be impossible of the communication, one or more pieces of destination specifying information stored corresponding to the destination from the storage unit, a display unit displaying a list of the searched destination specifying information, a selection module accepting a selection of a desired piece of destination specifying information from the list of the destination specifying information displayed, and a retransmitting module retransmitting based on the selected destination specifying information.

Herein, the communication device may be, for example, a telephone, a computer having a communication function, a personal digital assistant (PDA) and so on. Further, the destination specifying information is, e.g., a telephone number, an E-mail address and others.

According to the present invention, if judged to be impossible to communicating with the destination callee, the list of destination specifying information held by the destination callee is displayed, and the retransmission can be easily attained by use of a different piece of destination specifying information.

Preferably, the communication device may further include a timer measuring a calling time after starting the transmission, and the judging module may judge, if there is no answer within a predetermined calling time, that the communication can not be attained.

According to the present invention, if there is no answer from the destination callee within the predetermined calling time, it is judged to be impossible of communicating. This is the case where the callee does not answer to the telephone call. As a result, the list of destination specifying information of the destination callee is displayed, and the retransmission can be easily performed by use of the different piece of destination specifying information.

Preferably, the judging module may judge, if an answer to the transmission is an on-speech signal in a communication occurred due to other transmission, that the communication can not be attained. Herein, the communication occurred due to other transmission may include a communication occurred by calling up the destination callee from other telephone etc, and a communication occurred by dialing other telephone etc from this destination callee.

According to the present invention, if the answer to the transmission is the on-speech signal in the communication occurred due to other transmission, it is judged that the communication can not be attained. As a result, the list of destination specifying information of the callee is displayed, and it is possible to easily redial by used of a different piece of destination specifying information.

Preferably, the communication device may further include a key accepting a request for retransmitting, and the judging module may judge, when the key is pressed in the communication state occurred due to the transmission of the communication module, that the communication can not be attained and may cancel the communication state.

Herein, the key accepting the retransmitting request in the communication state is pressed in a case where, for instance, when receiving an answer in a reproduced voice of a message recorded therein in the case of calling up the destination callee on the telephone (when receiving the answer message from a so-called answering machine), the caller is informed of a callee's absence from his or her proxy. In such a case, the user presses the key making a redialing request.

According to the present invention, when the key described above is pressed, it is judged that the communication can not be attained. As a result, the list of destination specifying information of the destination callee is displayed, and it is possible to easily redial by use of a different piece of destination specifying information.

Preferably, the storage unit may store a transmission count for every piece of destination specifying information, and the display unit may display a list of the destination specifying information sorted based on the transmission counts.

The destination specifying information exhibiting a larger calling count has a greater using frequency by the callee. Hence, there must be a higher possibility of getting contact with the callee by using the destination specifying information exhibiting the larger calling count. Thus, according to the present invention, the probability of getting contact with the callee can be increased.

Preferably, the storage unit may store one or more telephone numbers or E-mail addresses as the destination specifying information on every destination, the display unit may display the searched telephone number of E-mail address, and the selection module may accept a selecting the telephone number or E-mail address.

Preferably, the communication device may further include a screen control module making a screen, when the E-mail address is selected on the selection module, transit to an E-mail creating screen for creating an E-mail addressed to this selected E-mail address.

According to the present invention, when judging that it is impossible to call up the destination callee, the E-mail can be easily created and delivered.

As explained above, according to the present invention, it is feasible to execute the continuous operation of transmitting through retransmitting by selecting the next piece of destination specifying information without performing the disconnection. Hence, according to the present invention, there is no labor of performing the complicated operations such as starting, e.g., a search program for searching for the destination specifying information, selecting a search command by name from a search menu, inputting the name and displaying a searched result.

According to another aspect of the present invention, a communication device has a destination specifying module specifying a destination of a communication, a storage unit storing one or more pieces of destination specifying information on every destination, a searching module searching for the destination specifying information on the specified destination from the storage unit, a display unit displaying a list of the searched destination specifying information, a selection module accepting a selection of a desired piece of destination specifying information from the list of destination specifying information displayed, and a communication module starting a transmission based on the selected destination specifying information.

Preferably, the destination specifying module may include a history storage module storing receipt histories, a history display module displaying a list of receipt histories, and a receipt history selection module accepting a selection of one receipt history from the list of receipt histories, and the destination specifying module may specify a transmission source corresponding to the selected receipt history as the destination.

According to the present invention, the user selects one call receiving history from the list of call receiving histories, and can set the transmission source of this call receiving history as the destination of the telephone or the E-mail. Pieces of destination specifying information of this destination are searched and displayed as a list, so that the user is able to easily transmit by use of the desired piece of destination specifying information.

Preferably, the destination specifying module may include an absent time receipt storage module storing receipt information when absent, an absent time display module displaying a list of receipt information when absent, and an absent time receipt information selection module accepting a selection of one piece of receipt information from the list of receipt information when absent, and the destination specifying module may specify a transmission source corresponding to the selected receipt information as the destination.

According to the present invention, the user selects one piece of call receiving information from the list of absent time call receiving information, and can set the transmission source corresponding to this piece of call receiving information as the destination of the telephone or the E-mail.

Preferably, the destination specifying module may include a received E-mail storage module storing information on received E-mails, a received E-mail display module displaying a list of received E-mails, and a received E-mail selection module accepting a selection of one received E-mail from the list of received E-mails, and the destination specifying module may specify a transmission source of the selected received E-mail as the destination.

According to the present invention, the user selects one received E-mail from the list of received E-mails, and can set the transmission source as the destination of the telephone or the E-mail.

Preferably, the destination specifying module may include a transmitted E-mail storage module storing information on transmitted E-mails, a transmitted E-mail display module displaying a list of transmitted E-mails, and a transmitted E-mail selection module accepting a selection of one transmitted E-mail from the list of transmitted E-mails, and the destination specifying module may specify a transmission source of the selected transmitted E-mail as the destination.

According to the present invention, the user selects one transmitted E-mail from the list of transmitted E-mails, and can set the transmittee thereof as the destination of the telephone or the E-mail.

Further, for instance, a key for a retransmitting request is pressed when receiving an answer from the answering machine of the telephone terminal of the callee and when somebody other than the target callee answers in the case of telephoning an office etc, where by the list of one or more other telephone numbers of a register can be obtained from the telephone directory data etc with a register name or a telephone number used as a key by pressing the retransmitting request key, and can be thus displayed. Herein,when selecting the desired telephone number from one or more telephone number displayed and dialing it, the transmission can be performed continuously from the disconnection. It is therefore feasible to save the labor for searching again from an address book, selecting from a redialing history and transmitting after temporarily disconnecting the telephone.

According to the present invention one of the components described above may be actualized as a program running on a machine or a computer.

According to still another aspect of the present invention, there is provided a communication method by which a machine or a computer executes one of the processes described above.

According to a still further aspect of the present, there is provided a program executed by the machine or the computer to actualize one of the functions described above.

According to a yet further aspect of the present invention, there is provided a storage medium readable by a machine, tangible embodying the program of instructions executable by the machine As described above, according to the present invention, it is feasible to easily execute the communication with the transmission callee having plural pieces of destination specifying information. Especially when difficult to communicate by use of one piece of destination specifying information, it is possible to easily communicate with the destination callee by using a different piece of destination specifying information intended by the caller.

BRIEF DESCRIPTION OF THE DRAWINGS

FIG. 4 is a table showing an example of a data structure of a telephone directory database;

FIG. 10 is a datagram showing an example of call receiving history data;

FIG. 13 is a diagram showing an example of answering machine record history data;

FIG. 15 is a diagram showing an example of received E-mail history data;

FIG. 16 is a view showing an image on the screen for dialing based on the received E-mail history;

FIG. 17 is a diagram showing an example of a telephone directory database in which the data are sorted based on dialing counts; and FIG. 18 is a view showing images on the dialing screen, wherein the telephone numbers and the E-mail addresses are sorted based on the dialing counts.

DETAILED DESCRIPTION OF THE PREFERRED EMBODIMENT

A preferred embodiment of the present invention will hereinafter be described with reference to the accompanying drawings.

First Embodiment

Figure 1:
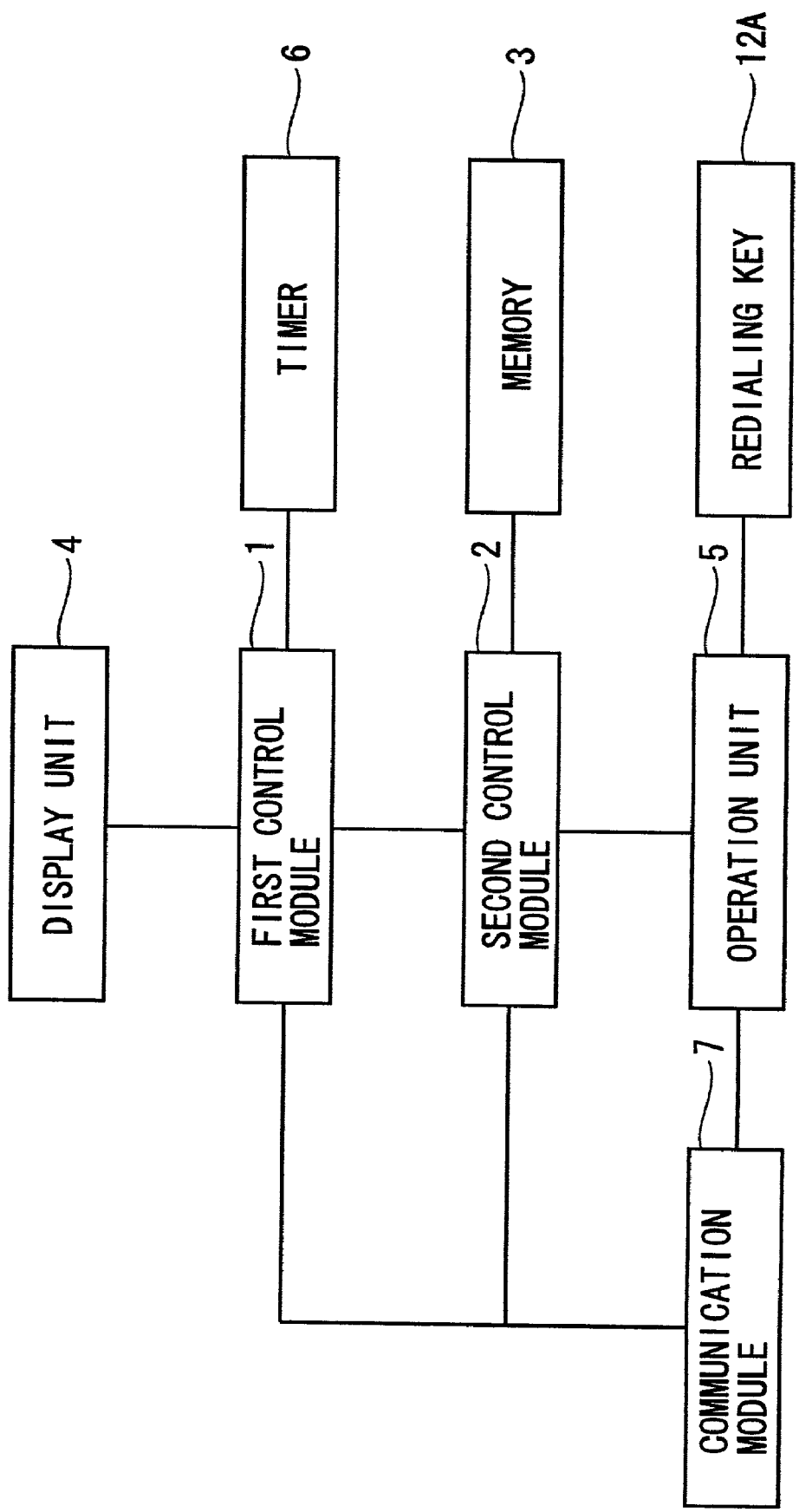
FIG. 1 is a diagram showing a principle of a mobile telephone in a first embodiment of the present invention.
Figure 2:
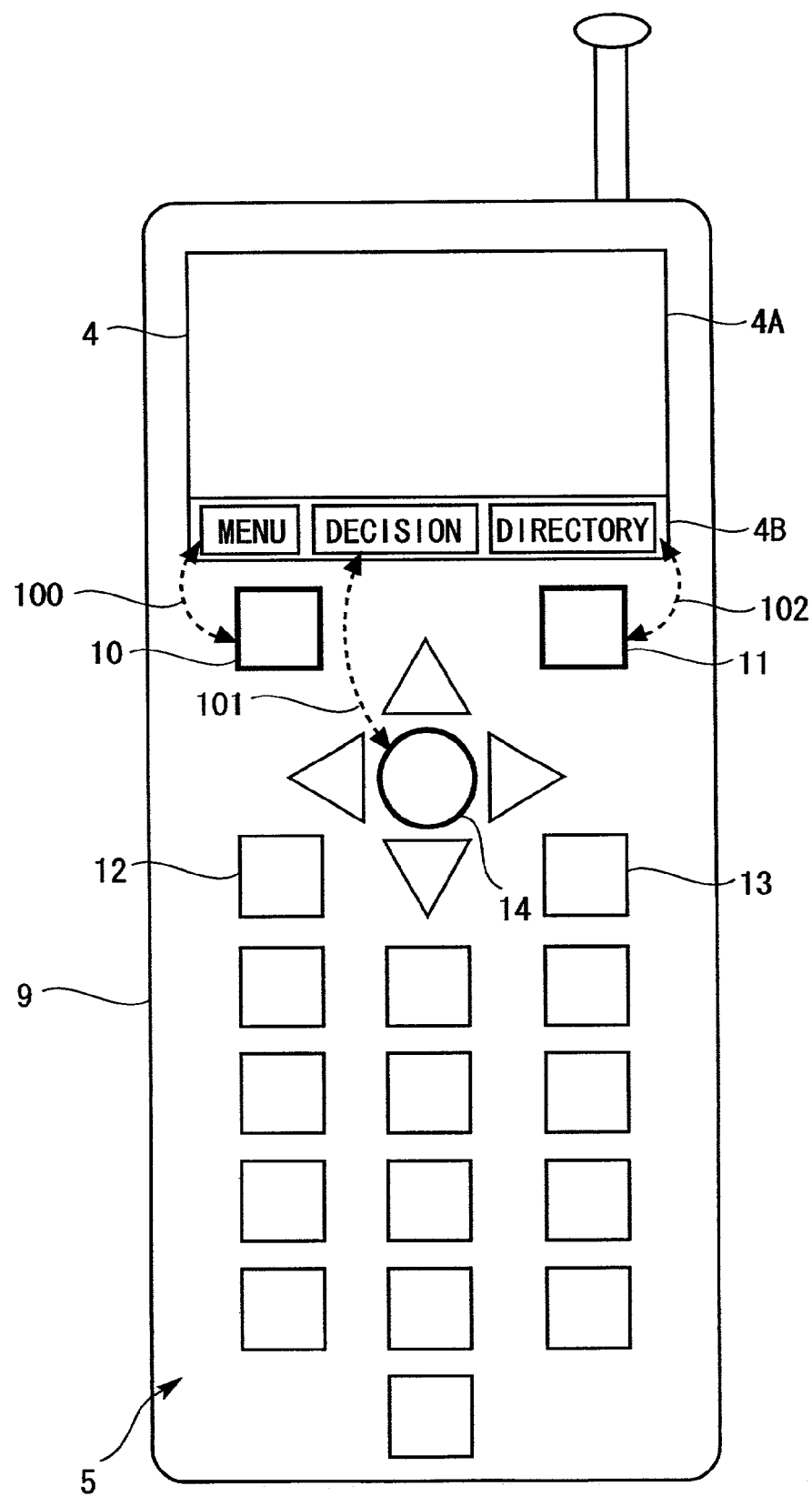
FIG. 2 is a view illustrating an external configuration of this mobile telephone.
Figure 3:
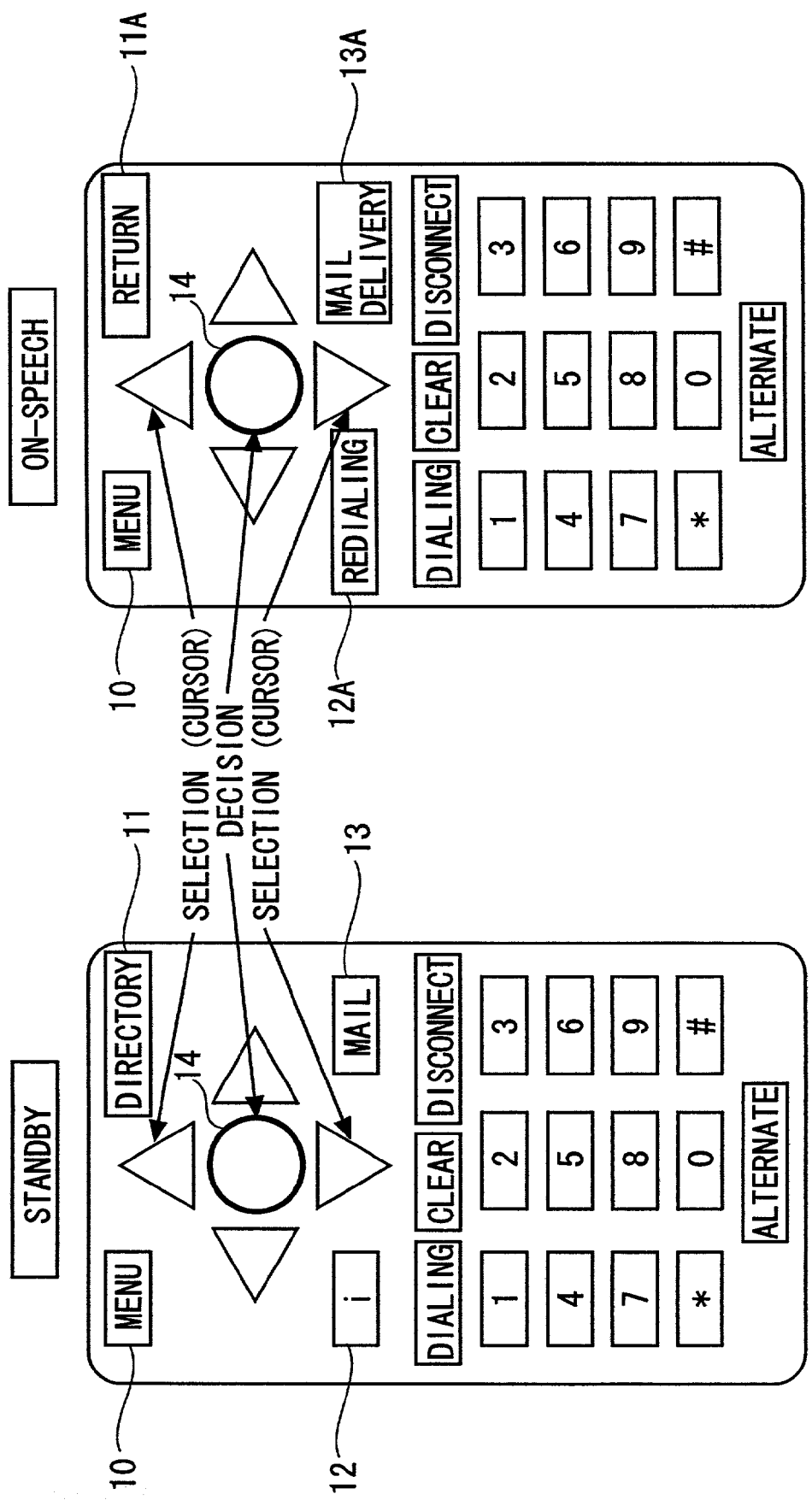
FIG. 3 is a view showing layouts of buttons on this mobile telephone.
Figure 5:
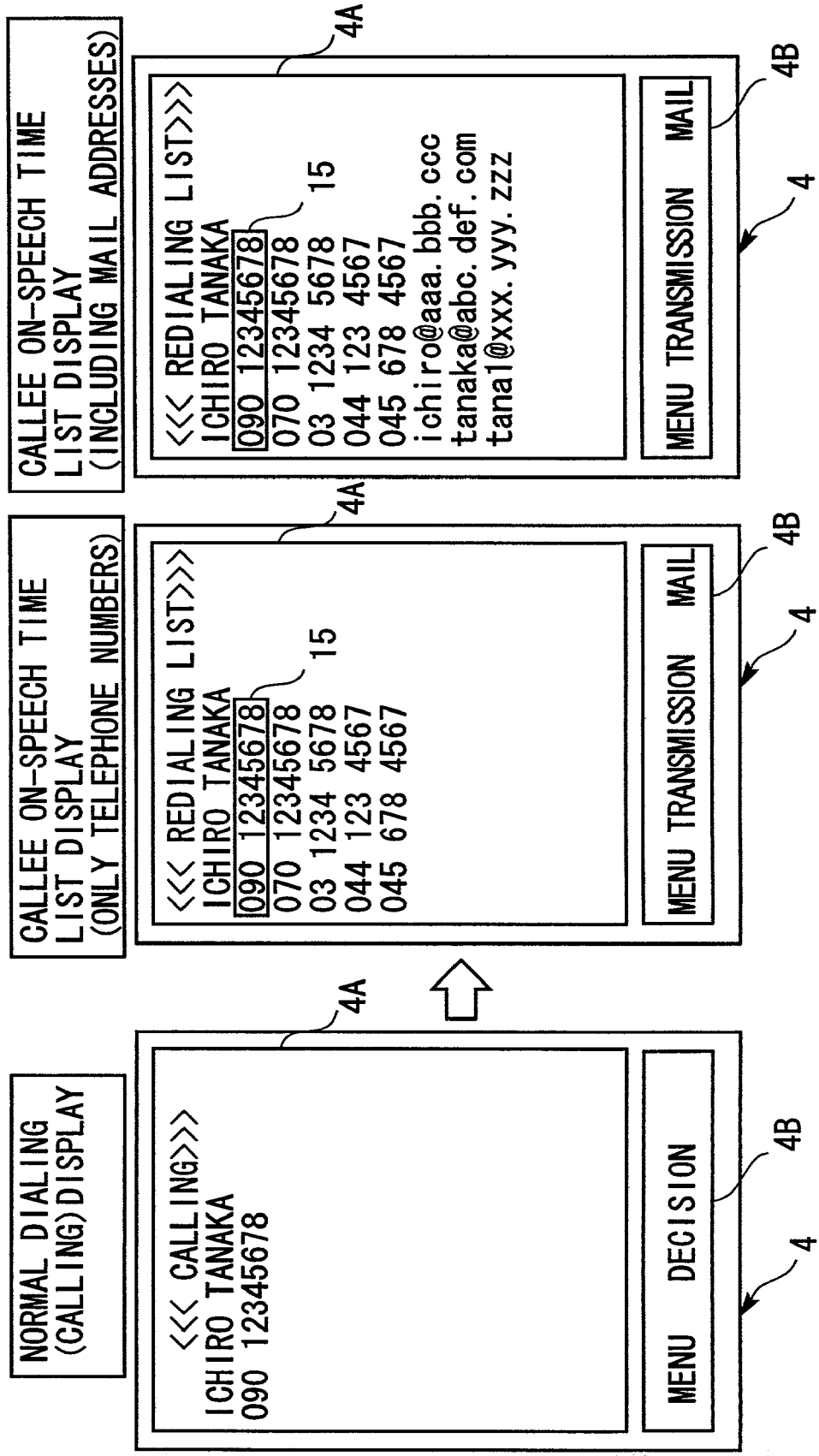
FIG. 5 is a diagram showing screen images when redialing on the mobile telephone.
Figure 6:
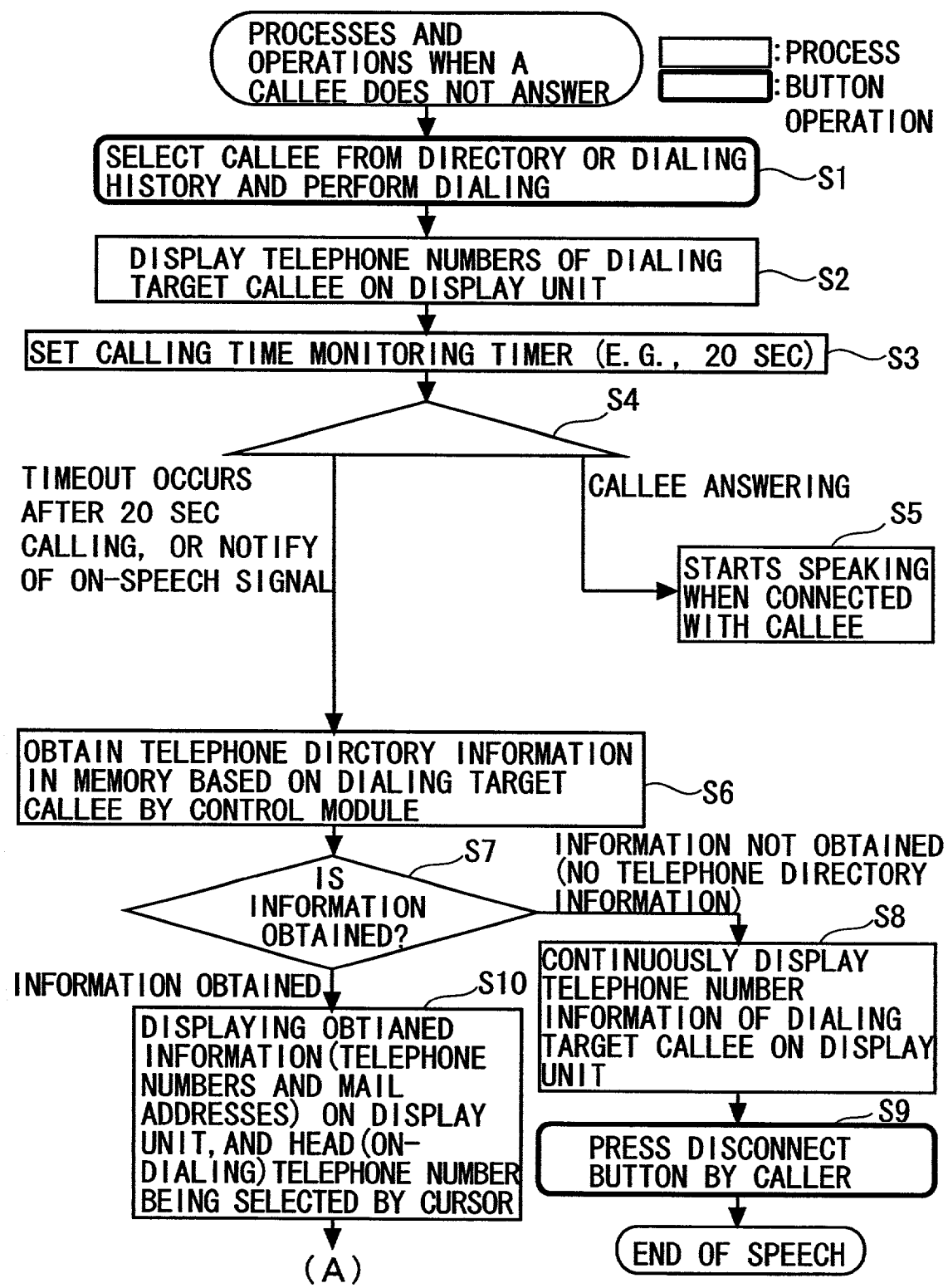
FIG. 6 is a flowchart (1) showing processes and operations when a callee does not answer.
Figure 7:
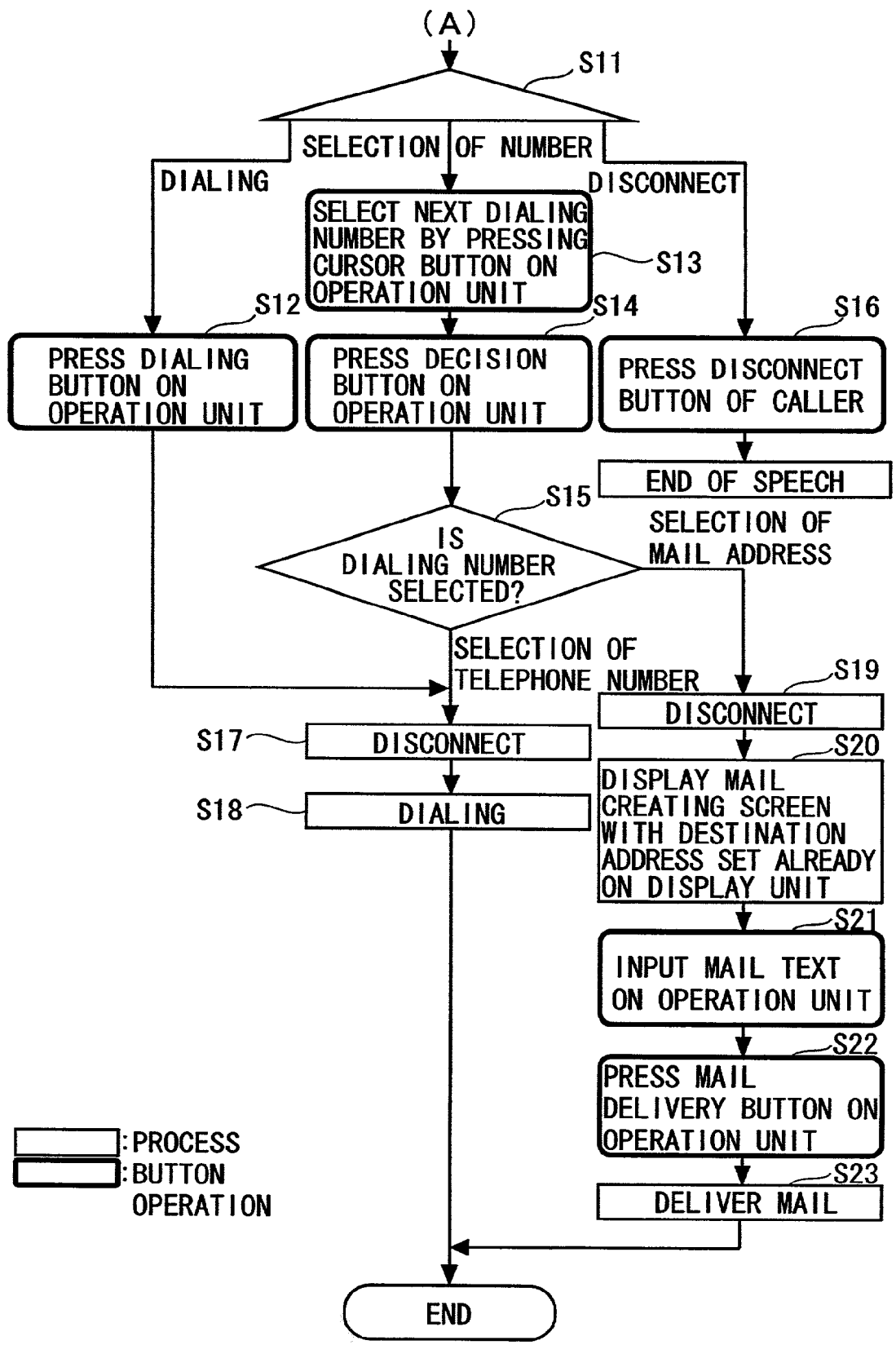
FIG. 7 is a flowchart (2) showing processes and operations when the callee does not answer.
Figure 8:
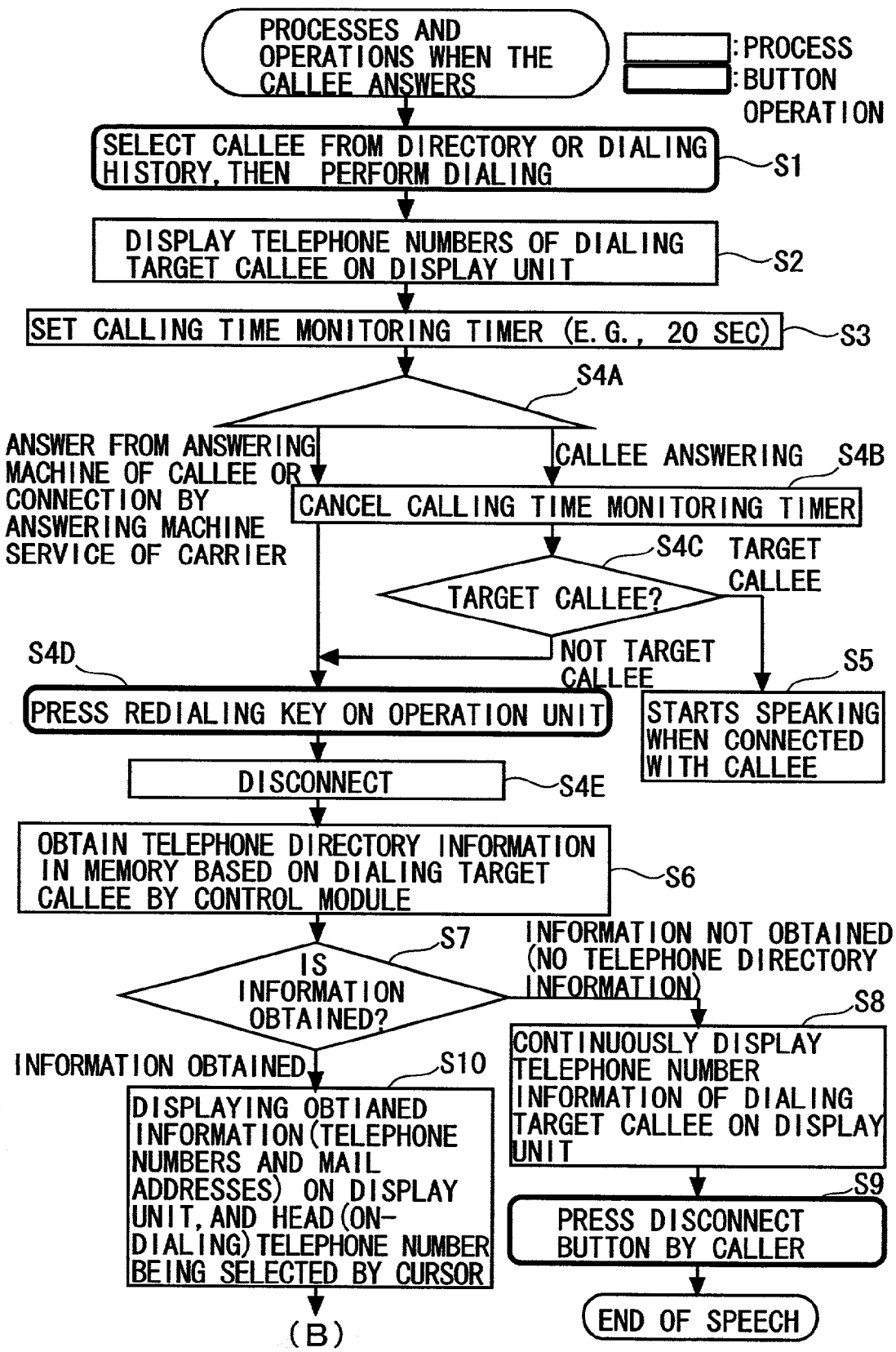
FIG. 8 is a flowchart (1) showing processes and operations when the callee answers.
Figure 9:
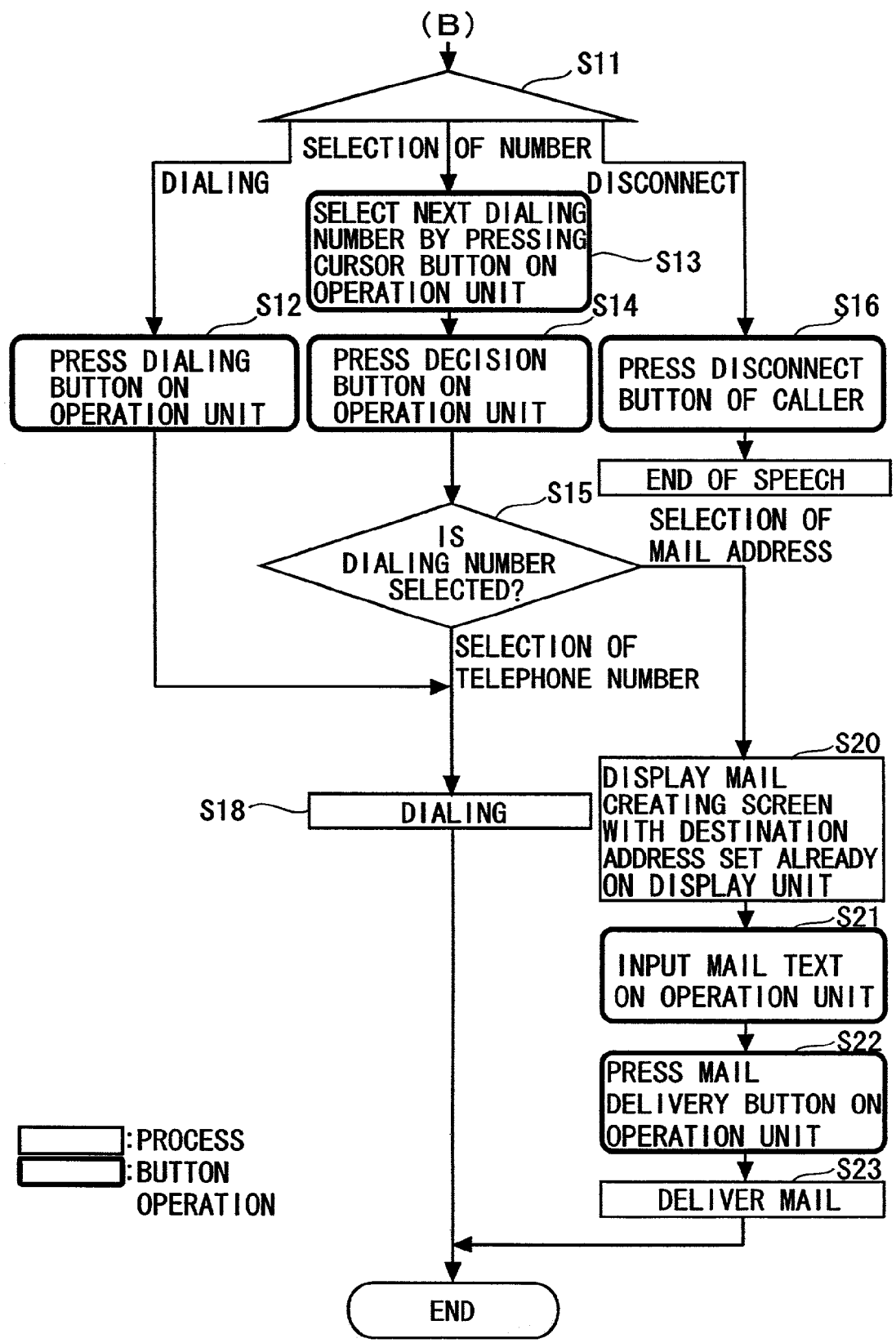
FIG. 9 is a flowchart (2) showing processes and operations when the callee answers.

A first embodiment of the present invention will hereinafter be discussed with reference to FIGS. 1 through 9. FIG. 1 is a diagram showing a principle of a mobile telephone in the first embodiment. FIG. 2 is a view illustrating an external configuration of this mobile telephone. FIG. 3 is a view showing layouts of buttons on this mobile telephone. FIG. 4 is a table showing an example of a data structure of a telephone directory stored in a memory 3 shown in FIG. 1. FIG. 5 is a diagram showing screen images when redialing on the mobile telephone. FIGS. 6 and 7 are flowcharts each showing processes and operations on this mobile telephone when a callee does not answer. FIGS. 8 and 9 are flowcharts each showing processes and operations on this mobile telephone when the callee answers.

<Principle of Automated Redialing>

The discussion in the first embodiment will be focused on a mobile telephone implementing an automated redialing function (which may also be called an automated redialing phone). The automated redialing function is defined as a function of, if difficult to establish a call-connection with the callee (which means that the callee does not answer) when dialing the target callee on the mobile telephone, or if substantially difficult to speak to the callee after establishing the call-connect (for example, there is an answer from an answering machine or a proxy answer saying the absence), telephoning the callee by use of other telephone numbers of this callee. According to this embodiment, this state is termed an impossible-of-calling state.

This automated redialing function may be automatically executed based on a judgement of a program installed in the mobile telephone and may be executed upon detecting a user event (operation) based on a judgement of the user of the mobile telephone. FIG. 1 is the view showing the principle of the mobile telephone that actualizes the automated redialing function described above.

This mobile telephone includes an operation unit 5 for detecting an operation of the user, a communication module 7 for calling up a destination callee in accordance with the operation detected by the operation unit 5, a timer 6 for counting a time, a first control module 1 for measuring a calling time of the communication module 7 with the aid of the timer 6, a memory 3 for retaining pieces of information in a telephone directory database etc, a second control module 2 for searching the telephone direction database etc of the memory 3 if judged impossible of calling up the destination callee when the calling time elapses over a predetermined period of time and so on, a redialing key 12A operated by the user to input the impossible-of-calling state, and a display unit 4 for displaying various categories of information.

The operation unit 5 has push buttons and detects the user's operation. The operation unit 5 transfers the detected user's operation to the communication module 7 and the second control module 2. Note that the buttons on the operation unit 5 may also be called keys.

The communication module 7, based on the user's operation on the operation unit 5, transmits a dial-up signal of the telephone by dialing a specified telephone number. Further, the communication module 7 receives a dial-up signal from other telephone, and notifies the display unit 4 of this call received. The communication module 7 has an antenna and a high-frequency modulation/demodulation circuit, however, their configurations are broadly employed in the mobile telephones, and hence their repetitive explanations are herein omitted.

The first control module is actualized as a program on an unillustrated CPU. Further, the timer 6 is actualized by a system program running on the CPU and on a clock module for driving the CPU. The first control module 1 measures an elapse time since the start of the dial-up by the communication module 7 with the aid of the timer 6.

According to the first embodiment, this elapse time is especially called a dialing time. Then, the first control module 1, when the dialing time elapses over a predetermined time, displays this elapse of time on the display unit 4 and notifies the second control module 2 of the same elapse of time.

The second control module 2 searches the telephone directory in the memory 3, which is triggered by the notification from the first control module 1. One or more telephone numbers are registered for every callee in the telephone directory in the memory 3. The second control module 2 specifies the destination callee on the basis of the telephone number that is being dialed by the communication module 7. Then, the second control module 2 searches for other telephone numbers possessed by this destination callee. The second control module 2 displays a list of the telephone numbers of the same destination callee on the display unit 4.

The memory 3 is stored with the data such as the above-described telephone directory data and the system program for controlling the mobile telephone. The memory 3 is constructed of, for example, a flash memory, a DRAM (Dynamic Random Access Memory) and so on.

The display unit 4 displays the output information of the first and second control modules, menus, icons and others manipulated on the operation unit 5. The display unit 4 is, e.g., a liquid crystal panel, an EL (Electro-Luminescence) panel and so forth.

Then, as described above, if there is no answer from the destination callee even after the predetermined dialing time has elapsed, the display unit 4 displays the list of the telephone numbers of the destination callee which have been searched by the second control module 2, which is triggered by the notification from the first control module 1.

The user is able to select a desired telephone number from the list of those telephone numbers by use of a cursor on the screen that can be manipulated on the operation unit 5. The mobile telephone in the first embodiment, upon detecting an event of selecting the desired telephone number from the list and an event of indication of dialing, executes redialing this telephone number.

Further, this mobile telephone provides the same function also in a case where the communication device of the destination callee answers by transmitting an on-speech signal indicating an on-communication state with other communication device in addition to the case of giving no answer within the answering time described above.

Moreover, even when establishing the connection with the destination callee and coming into the speaking state, the mobile telephone provides the same redialing function as what has been described above in a case where the user is hard to substantially speak to the desired callee, for instance, a case of receiving a message from the answering machine, a case of being prompted to utter a message such as a voice message etc, and a case of being informed of a callee's absence from a proxy for the callee.

In these cases, however, the mobile telephone itself is incapable of judging whether the substantial speech is hard or not. Such being the case, this mobile telephone is provided with the redialing key 12A for inputting an indication of an intention of redialing because of reaching such a state during the speech.

The user presses the redialing key 12A during the speech, whereby the second control module 2 specifies the telephone number that remains connected at the present, and searches for other telephone numbers of the callee in the memory 3. Then, the display unit 4 displays the list of the searched telephone numbers and accepts a user's selection on the operation unit 5.

<External Configuration of Mobile Telephone>

FIG. 2 is the view illustrating the external configuration of this mobile telephone. As shown in FIG. 2, the mobile telephone includes the display unit 5 and the operation unit 5 on the surface of a box body 9. Further, the display unit 4 is sectioned into a main display area 4A and a sub-display area 4B.

Displayed in the main display area 4A, menus, icons, telephone numbers when calling and called, an electronic letter (E-letter) (containing a title, a destination, a sender, a text and so on) of an E-mail, a Web site on the Internet and others. On the other hand, the sub-display area 4B displays a name of function allocated at the present by a key capable of allocating a function (which will hereinafter be referred to as an allocation key).

Referring to FIG. 2, functions such as [MENU], [Decision] and [Directory] are displayed in this sub-display area 4B. Each of these functions represents the present function of the allocation key indicated by any of arrows 100, 101 and 102. Note a string Directory means the function for displaying telephone directory.

To be specific, the allocation keys (each depicted by the bold lines in FIG. 2) are rectangular keys 10, 11 disposed in uppermost right and left positions on the operation unit 5 and a circular decision key 14 surrounded by four pieces of arrowhead keys. The key allocation described above is controlled by a control program executed on the unillustrated CPU.

Note there is no necessity of displaying all the allocation key functions on the sub-display area 4B. Namely, if a display areal size of the sub-display area 4B is increased, a size of the main display area 4A is inevitably reduced. Then, the keys displayed in the sub-display area 4B among the allocation keys maybe limited based on a switching frequency and a using frequency. Referring again to FIG. 2, functions allocated to buttons 12 and 13, though categorized as allocation keys, are not displayed in the sub-display area 4B.

FIG. 3 is the view showing the layouts of those buttons. FIG. 3 illustrates the button layouts when in a standby status and in speech.

To describe it, the allocation keys 10, 11 are laid out in the uppermost area in the array of the buttons. Further, the right-and-left and-up-and-down arrowhead keys (each depicted in a triangular shape and indicated by a character string such as a selection (cursor) in FIG. 3) and the decision key 14 surrounded by these arrowhead keys, are laid out just under the allocation keys 10, 11. The decision key 14 may also be defined as one of the allocation keys.

The user manipulates the arrowhead keys and is thereby able to move the cursor onto the menu and the list. Further, the user presses the decision key 14 in a state where an element of the menu or the list is selected by the cursor, and is thus able to settle the decision (selection). For example, the user presses the decision key 14 in a state where one telephone number is selected by the cursor on the list of the telephone numbers, thereby dialing this telephone number.

When in the standby status, the function [MENU] is allocated to the allocation key 10 (which will hereinafter be also called a [MENU] key 10). Herein, the standby status means a status of being possible of receiving a call-up from other telephone. When pressing the [MENU] key 10 in the stand by status, a menu for providing a various categories of functions is displayed on the display unit 4.

Further, when pressing the allocation key 11 indicated by [Directory] (which will hereinafter be also called a [Directory] key 11), a telephone directory is displayed on the display unit 4. Moreover, a key 12 indicated by [i] (which will hereinafter be referred to as an [i] key 12) and a key 13 indicated by [mail] (which will hereinafter be called a [mail] key 13), are also defined as the allocation keys. Functions of these keys are not, however, displayed in the sub-display area 4B.

The [i] key 12 is used when connected to the Internet. Further the [mail] key 13 is used for creating an E-letter of an E-mail.

On the other hand, the allocation key 10 remains to be the [MENU] key 10 during the speech, however, the allocation key 11 is changed into a [return] key 11A. The [return] key 11A is used when returning to a normal speech screen (or when scrolled back one step on the menu hierarchy) from the state where the menu is displayed upon pressing the [MENU] key 10 during the speech.

Further, the [i] key 12 in the standby status is changed into a [redialing] key 12A during the speech. The redialing key 12A is used when the user requests redialing by disconnecting the connection (speaking state) during the speech.

Moreover, the [mail] key 13 in the standby status is changed into a [mail delivery] key 13A during the speech. Upon pressing the [mail delivery] key 13A, an E-letter creating function for the E-mail is provided. Unlike the [mail] key 13, however, in the process by the [mail delivery] key 13A, the E-mail is delivered to the on-speech callee immediately after creating the E-letter.

<Structure of Telephone Directory>

FIG. 4 shows the example of the data structure of the telephone directory database stored in the memory 3. Each of column in the table in FIG. 4 corresponds to one record of data in the database. This one record consists of pieces of data about one destination callee of the telephone or one receiver of the E-mail. Each record in this telephone directory database contains data entered in a "directory No." field, a "name" field, a "telephones 1-5" field, a "mails 1-3" field, a "group" field and a "memorandum" field.

A serial number of each record is entered in the "directory No." field. Further, the "name" field is stored with a name of the callee or receiver. The "telephones 1-5" fields is stored with telephone numbers of the telephone possessed by the callee. Accordingly, five types of telephone numbers at the maximum per callee can be recorded in this telephone directory database. The embodiment of the present invention is not, however, limited to the recordable count of the telephone numbers.

Further, the "mails 1-3" field is stored with addresses of the E-mails that are possessed by the mail receiver. Hence, three types of mail addresses at the maximum per receiver can be recorded in this telephone directory database. The embodiment of the present invention is not, however, limited to the recordable count of the E-mail addresses.

The "group" field is recorded with a group category of the callee or receiver (a name of group category). The group categories are, for instance, a friend, a working place, a callee's or receiver's superior, a business acquaintance, a family and so on.

<Screen Layout>

FIG. 5 shows images on the screen when redialing. For example, in the case of normal dialing (calling), a title such as <<<calling>>>, a name of the callee, and a dialed telephone number are displayed in the main display area 4A.

Then, if an answer from the callee (Ichiro Tanaka in FIG. is an on-speech signal, i.e., the signal indicating that the callee stays connected to other telephone, a list of the telephone numbers of the telephones possessed by the callee (Ichiro Tanaka) is displayed.

This list displayed contains a title such as <<<redialing list>>>, a name of the destination callee (Ichiro Tanaka in FIG. 5) and the telephone numbers held by the callee.

A cursor 15 (indicated by a framed pattern in FIG. 5) is displayed in this list. When the user selects a desired telephone number by manipulating the arrowhead key and thus selecting a desired telephone number and then presses the dialing key (it can be understood from the display in the sub-display area 4B that the decision key 14 functions as the dialing key), the mobile telephone interrupts the present dialing and redials the telephone number selected above.

Note that the list described above may contain the E-mail addresses by user's setting. Namely, according to this mobile telephone, when the destination callee is in the midst of speaking the user selects the E-mail address of the callee and presses a transmission button, thereby displaying a screen for creating an E-mail to that E-mail address.

<Operation>

FIGS. 6 through 9 show user operations on the mobile telephone and processes of the mobile telephone that are executed corresponding to the user operations. These processes are actualized by a program running on a built-in CPU of the mobile telephone. Referring to FIGS. 6 through 9, each rectangular shape depicted by a thin line shows the process, while substantially a rectangular shape (its corners are rounded) indicates a user's button operation.

FIGS. 6 and 7 are flowcharts showing the processes and the operations on this mobile telephone when the destination callee does not answer. This flow starts with such an event that the user selects the callee in the telephone directory or in a dialing history and performs dialing (S1).

Then, the mobile telephone displays a callee's telephone number that is being dialed (S2). Next, the mobile telephone sets a monitoring time in the dialing time monitoring timer (the timer 6 in FIG. 1) (S3). This monitoring time is, e.g., 20 sec.

The processing diverts depending on whether the callee answers within this monitoring time (S4). If the callee answers within the monitoring time, the mobile telephone establishes a connection with the callee's telephone and starts speaking (S5).

While on the other hand, if the callee does not answer within the monitoring time (e.g., 20 sec), a timeout occurs. In this case, the second control module 2 (that is described simply as the control module in FIG. 6) of the mobile telephone searches the telephone directory database in the memory 3 on the basis of information on the callee who is being called up, and thus obtains the telephone directory information of the callee (S6).

Next, the mobile telephone (the second control module 2) judges whether the information can be obtained (S7). If unable to obtain the directory information of the callee, the mobile telephone continuously displays on the display unit 4 the telephone number information of the callee who is being called up (S8). In this case, the user normally presses a disconnection button because of no answer from the callee (S9), thus finishing the dialing.

When judging in S7 that the telephone number information of the callee can be obtained, the mobile telephone (the second control module 2) displays a list of the acquired information on the display unit 4. The acquired information contains the telephone number, the E-mail address etc of the callee. A head line of the list is the telephone number that is now being dialed. Further, the cursor is placed on the head of the list (S10).

The processing to be executed next diverts depending on a user operation (S11). If the user operation is to press the transmission button (S12), the present dialing is temporarily cut off (S17), and the same telephone number is again dialed (S18).

On the other hand, if the user operation is to select the telephone number from the list of acquired information, i.e., if the user presses the arrowhead key (depicted as a cursor button in FIG. 7), the cursor moves to the next line on the list displayed, and this line becomes selectable (S13).

Next, the user presses the decision key 14 (shown as a decision button in FIG. 7) of the operation unit 5. Then, the mobile telephone judges whether the telephone number of the E-mail address is selected (S15). If the telephone number is selected, the mobile telephone interrupts the present dialing (S17) and dials the telephone number selected afresh (S18).

Further, when judging in S15 that the E-mail address is selected, the mobile telephone interrupts the present dialing (S19). Then, the mobile telephone sets a destination address to the E-mail address selected above, and displays the E-mail creating screen on the display unit 4 (S20).

Then, the user inputs an E-mail text through the operation unit 5 (S21). Subsequently, the user presses an E-mail delivery button on the operation unit 5 (S22). Upon pressing this button, the mobile telephone delivers the E-mail (S23). Thereafter, the mobile telephone finishes processing.

FIGS. 8 and 9 are flowcharts showing the processes and the operations on this mobile telephone when the destination callee answers. The processes in these flowcharts are substantially the same as those in the FIGS. 6 and 7, except for the processes occurred when the destination callee answers. The same processes are therefore marked with the same symbols, and the repetitive explanations are herein omitted.

These processing flows are based on the assumption that the destination callee answers after setting the dialing time monitoring timer (S4A).

To start with, when the telephone of the callee answers, mobile telephone cancels the dialing time monitoring timer (S4B). Then, the mobile telephone waits for an input indicating whether the target callee answers. In this case, if the target callee answers, the mobile telephone directly gets connected to the telephone of the callee and starts speaking (S5).

Whereas if the target callee does not answer, the user may press the redialing key 12A on the operation unit 5 (S4D). The case that the target callee does not answer may include a case where the target callee is absent and his or her proxy answers.

Similarly, in S4A, if the answering content is a connection to an answering machine service provided by a telephone company (a carrier), a request for giving a voice message and so on, the user may also press the redialing key 12A (S4D). Then, the mobile telephone temporarily disconnects the present connection (S4E).

Then, the mobile telephone searches the telephone directory database in the memory 3 with the information on the on-dialing callee serving as a key, thereby obtaining the directory information on the target callee (S6). The processes in S6 through S23 are the same as those in FIGS. 6 and 7, and hence their repetitive explanations are omitted. Referring to FIG. 9, however, the mobile telephone is not calling up, the dialing cut-off process (S17 and S19) shown in FIG. 7 is not executed.

<Effects of the Embodiment>

As discussed above, the mobile telephone in the first embodiment, if judged to be impossible or difficult to talk with the destination callee, displays the list of other telephone numbers and E-mail addresses of this callee and easily executes redialing one of these other telephone numbers or delivering the E-mail.

Herein, the case of judging that the speaking to the callee is impossible or difficult may include, for example, a case where the callee does not answer, a case where the telephone of the callee is being connected (speaking) to other telephone, a case where the callee is absent and the answering machines answers, a case where the callee is absent from his or her desk equipped with the dialing target telephone and his or her proxy answers, a case where the communication line is congested to make a smooth speech difficult, and a case where the substantial speech can not be attained because of an ill-connected state of the mobile telephone of the callee.

Then, the mobile telephone (the second control module 2), if the callee does not answer within a predetermined period of time or if the telephone of the callee is in the midst of speaking other telephone, searches the telephone directory database in the memory 3, and displays on the display unit 4 the directory information (the list of the telephone numbers and the E-mail addresses) of the destination callee.

On the other hand, if unable to speak to the callee on the phone though connected, the second control module 2 searches the telephone directory database in the memory 3, which is triggered by the user's pressing the redialing key 12A, and displays the telephone directory information of this destination callee.

The telephone directory information can be selected by use of the cursor 15, and it is possible to easily select a desired telephone number or E-mail address from the plurality of telephone numbers and mail addresses of the callee and to dial the telephone number or deliver the E-mail.

<Modified Example>

The discussion in the embodiment of the present invention has been focused on the mobile telephone implementing the automatic redialing function. The embodiment of the present invention is not, however, limited to the mobile telephone. For example, the present invention can be embodied in a PHS (Personal Handyphone System). Further, the present invention can also be embodied in a normal fixed type of telephone.

According to the embodiment discussed above, the cursor is expressed by the framed pattern. The embodiment of the present invention is not, however, limited to the above shape of the cursor. For example, the cursor 15 may be displayed such as displaying the selected area in black and white reversely, underlining it, displaying it in a way that changes the color, flicker-displaying it and so on.

Second Embodiment

Figure 11:
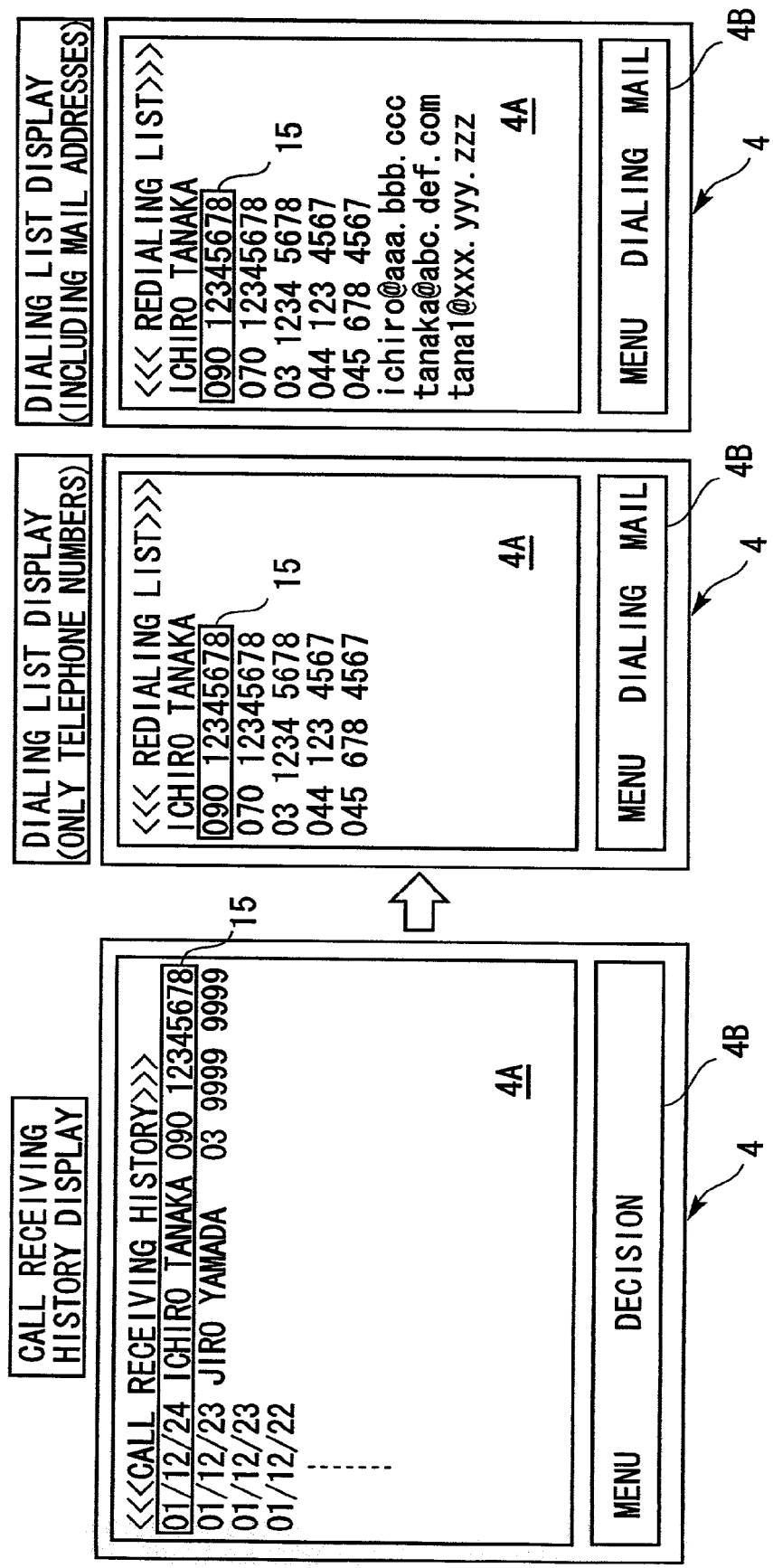
FIG. 11 is a view showing images on the screen for dialing based on the call receiving history.
Figure 12:
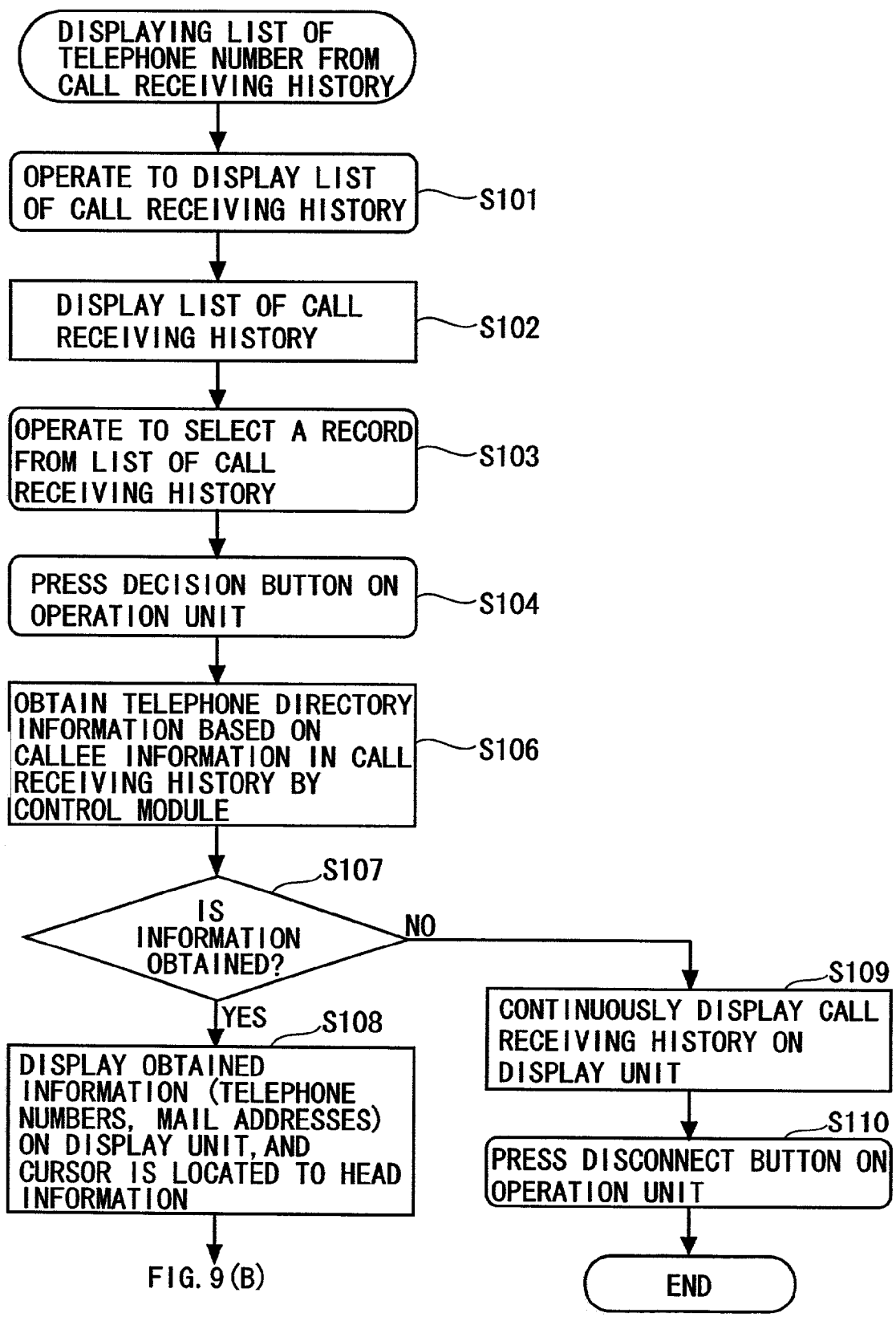
FIG. 12 is a flowchart showing processes and operations for displaying a list of telephone number of the callee on the call receiving history display screen.
Figure 14:
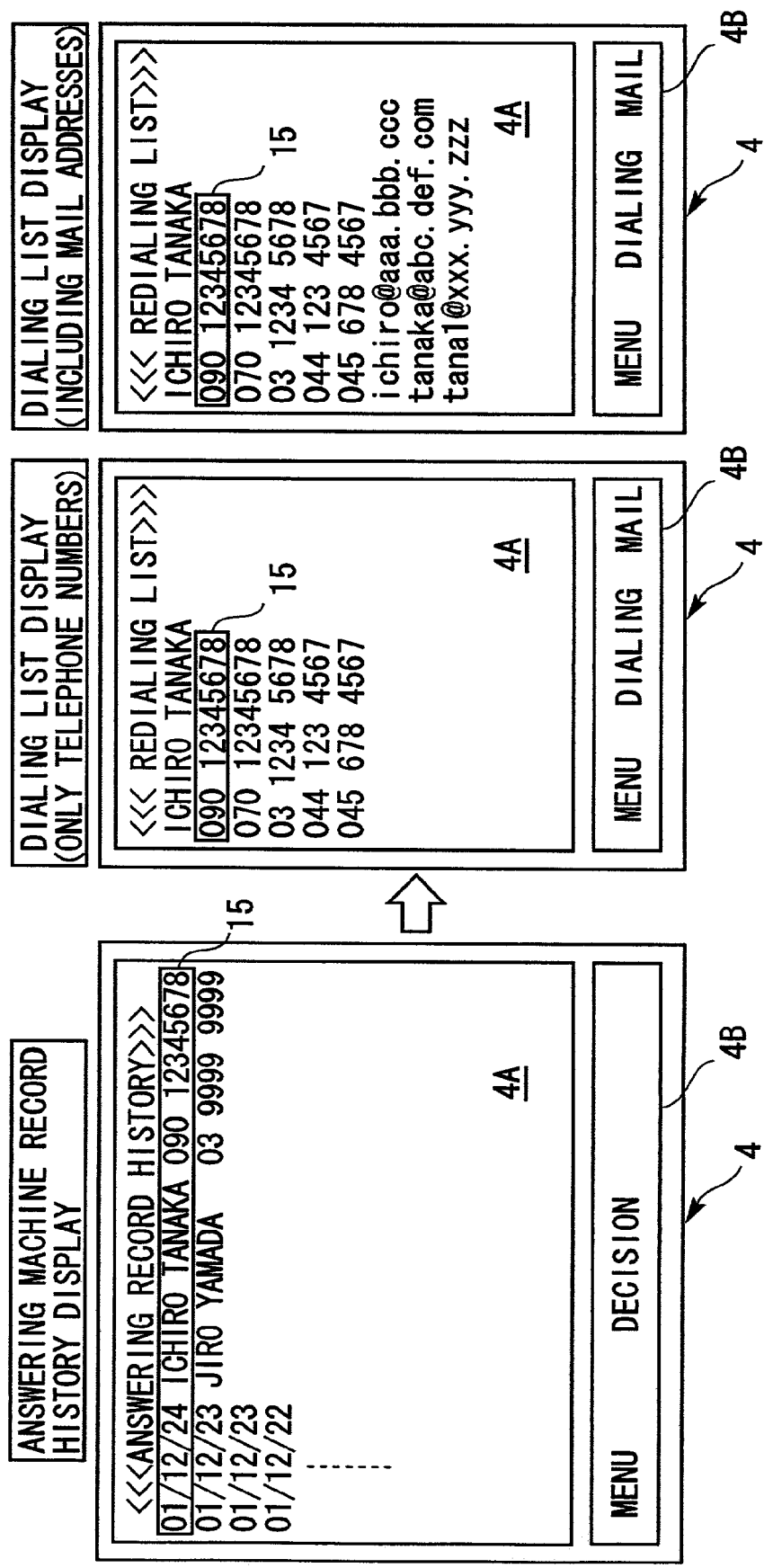
FIG. 14 is a view showing an image on the screen for dialing based on the answering machine record history data.

A second embodiment of the present invention will hereinafter be described with reference to FIGS. 10 through 18. FIG. 10 shows an example of call receiving history data stored in the telephone in the second embodiment. FIG. 11 is a view showing images on the screen for dialing based on the call receiving history. FIG. 12 is a flowchart showing processes and operations for displaying a list of telephone number of the callee from the call receiving history display screen. FIG. 13 shows an example of answering machine record history data. FIG. 14 is a view showing an image on the screen for dialing based on the answering machine record history data. FIG. 15 shows an example of received E-mail history data. FIG. 16 is a view showing an image on the screen for dialing based on the received E-mail history. FIG. 17 shows an example of a telephone directory database in which the data are sorted based on dialing counts. FIG. 18 is a view showing images on the dialing screen, wherein the telephone numbers and the E-mail addresses are sorted based on the dialing counts.

The discussion in the first embodiment has been focused on the telephone providing the function of easily redialing other telephone number of the callee concerned or delivering the E-mail if judged to be impossible or difficult to speak to the destination callee when giving the telephone call.

The second embodiment will discuss a telephone providing a function capable of displaying, when performing an operation other than dialing on the telephone such as displaying a list of the call receiving history, one or more telephone numbers and E-mail addresses of the caller with respect to the specified call receiving history data, and easily dialing or delivering the E-mail as in the first embodiment. Other configurations and operations are the same as those in the first embodiment. The same components are therefore marked with the same symbols, and the repetitive explanations are omitted. Further, the drawings in FIGS. 1 through 9 will be referred to when the necessity may arise.

Embodiment

FIG. 10 shows the example of the call receiving history data. The call receiving history data is structured in the memory shown in FIG. 1 and stored with pieces of information on the telephone calls received. Each of lines in the table illustrated in FIG. 10 corresponds to one record of call receiving history data of one call arrived.

The call receiving history data has a "call receiving history number" field, a "call receiving date and time" field, a "caller telephone number" field and a "caller name" field. The call receiving history number is a serial number for uniquely identifying each record of the call receiving history data. The call receiving date and time are a date and a time when the call arrived. Further, the caller telephone number is a telephone number of the caller, which is given in a caller number notification service provided by the telephone company. Moreover, the caller name is a name of the caller. The caller name is obtained from the telephone directory database shown in FIG. 4 on the basis of the telephone number of the caller when receiving the call. If the telephone number of this caller is not registered in the telephone directory database, however, the "caller name" field is blanked.

The respective records of call receiving history data are stored in the call receiving sequence in a predetermined area of the memory 3. This area configures a ring buffer having a predetermined capacity. Accordingly, if a predetermined or greater number of calls are received, the older data are overwritten in sequence. Note that the calls received for a predetermined period of time may be stored without using the ring buffer. Namely, there may be deleted the call receiving history data with an elapse of a predetermined period, e.g., 30 days since the call receiving date.

FIG. 11 is the view showing the images on the screen for dialing based on the call receiving history. The structure shown in FIG. 11 is substantially the same as FIG. 5 except for the left screen (that is referred to as a call receiving history display screen). When the user operates the operation unit 5 to display the call receiving history, the call receiving history display screen shown at the left portion in FIG. 11 is displayed.

This call receiving history display screen displays a title such as <<<call receiving history>>> and a list of call receiving history data. In the list of call receiving history, the respective records of call receiving history data are shown in time-series normally from the latest record. These records may, however, be displayed from the oldest record in its call receiving date and time by operating the operation unit 5.

The head line on this call receiving history display screen is focused by the cursor 15 (it means a state in which the head line is selected) immediately after being displayed. The user can move the cursor 15 on the call receiving history display screen by manipulating the arrowhead keys. When pressing the decision key 14 after moving the cursor 15 onto a desired record of call receiving history data, there is displayed a list of telephone numbers of the telephones possessed by the destination callee (Ichiro Tanaka in FIG. 11) in this record of call receiving history data. Further, the user selects a desired telephone number from this telephone number list and presses the decision key 14, thus dialing this telephone number. As explained above, the user is able to call up a desired callee by selecting the desired telephone number from the plurality of telephone numbers held by this callee and dialing this selected telephone number on the present telephone.

Note that the list of the E-mail addresses in addition to the list of the telephone numbers may be displayed (the right screen in FIG. 11) as in the first embodiment. Owing to this scheme, the user can display the list of the E-mail addresses of the desired callee from the call receiving history that is now being displayed, then select a desired E-mail address therefrom, and immediately create and deliver the E-mail.

FIG. 12 is the flowchart showing the processes and the operations for displaying the list of the telephone numbers of the callee from the call receiving history screen. This flow starts with the user's operating the operation unit 5 to display the list of the call receiving history (S101).

Then, the list of the call receiving history is displayed on the display unit 4 (S102). Next, the user moves the cursor 15 by using the arrowhead keys, thus selecting one record of data from the call receiving history (S103).

Then, the user presses the decision key 14 in a state where the cursor 15 is located to the desired record of call receiving history (S104). Subsequently, the second control module 2 (which is simply described as the control module 2 in FIG. 12) searches the telephone directory database on the basis of the destination callee information (e.g., the telephone number) in the call receiving history. Then, the second control module 2 obtains the telephone directory information of the caller (S106).

Next, the telephone judges whether the information can be obtained (S017). If unable to obtain the information, the telephone continuously displays the call receiving history on the display unit (S109). When the user presses the disconnection button on the operation unit 5, the telephone finishes processing.

Whereas if judged in S107 to be able to obtain the information, the telephone displays the obtained information such as the telephone number and the E-mail address etc on the display unit 4. The processes after this onward are the same as the processes shown in FIG. 9(B) onward.

As discussed above, the telephone in the second embodiment prompts the user to select the desired record of call receiving history data during the display of the list of call receiving history, and the list of telephone numbers and E-mail addresses of the caller specified by the selected record of call receiving history, is displayed. Then, the user selects the desired telephone number or E-mail address and is thereby able to easily dial the selected telephone number or deliver the E-mail to the selected E-mail address.

<Modified Example Based on Answering Machine Record History>

The discussion in the second embodiment has been focused on the function of displaying the list of telephone numbers and E-mail addresses of the caller from the call receiving history, and dialing the desired telephone number of the caller on the phone or delivering the E-mail to the desired E-mail address thereof.

The embodiment of the present invention is not, however, confined to the configurations and procedures described above. For instance, the user may dial the telephone number of the caller or deliver the E-mail to the caller on the basis of a voice record history in the answering machine as a substitute for the list of call receiving history.

FIG. 13 shows the example of the answering machine record history data retained in the memory 3 of the telephone implementing such an answering machine function. The answering machine record history data is defined as a history when using the answering machine function during the absence of the user of the telephone. When using the answering machine function, the telephone reproduces a message recorded in the answering machine and further prompts the caller of the telephone receiving the call to record a voice message.

As shown in FIG. 13, the answering machine record history data has an "answering record number" field, a "recording completion date and time" field, a "caller telephone number" field, and a "caller name" field. A structure of this answering machine record history data is substantially the same as the call receiving history data shown in FIG.10 except for the answering record number and the recording completion date and time. Further, the procedure of accumulating the answering machine record history data is the same as that of the call receiving history data.

The answering record number is defined as a serial number for uniquely identifying each record of answering machine record history data. Moreover, the recording completion data and time are a date and a time when the recording is completed based on the answering machine function. If the caller does not record any voice message, however, the above date and time are a date and a time when disconnecting this telephone.

FIG. 14 is the view showing the images on the screen for dialing based on the answering machine record history. Referring to FIG. 14, a different point from the call receiving history in FIG. 11 is that the voice record history in the answering machine is displayed on the left screen.

Namely, when the user operates the operation unit 5 to display the answering machine record history. Then, the telephone displays a list of answering machine record histories titled <<<answering record history>> on the display unit 5. The user selects a desired record of history by use of the cursor and presses the decision key 14. Thereupon, a list of telephone numbers of the caller is displayed (on the central screen in FIG. 14). Further, a telephone number list including E-mail addresses may also be displayed (on the right screen in FIG. 14).

Then, the user selects the telephone number or the E-mail address, whereby the user can easily dial the desired telephone number of the telephone or deliver the E-mail to the desired E-mail address as in the second embodiment.

<Modified Example Based on Received E-mail History>

Moreover, a call may be given or an E-mail may be delivered to the caller on the basis of a history of the E-mails received as a substitute for the list of call receiving history.

FIG. 15 shows the example of received E-mail history data stored in the memory 3 of the telephone implementing such a function. The received E-mail history data are defined as a history of the E-mails received by the present telephone.

As shown in FIG. 15, the received E-mail history data has a "received mail number" field, a "receiving date and time" field, a "sender E-mail address" field and a "sender name" field. A structure of this received E-mail history data is substantially the same as the call receiving history data shown in FIG. 10 except for the received mail number, the receiving date and time and the received E-mail address. Moreover, a procedure of accumulating the received E-mail history data is the same as that of the call receiving history data.

Herein, the received mail number is defined as a serial number for uniquely identifying each record of received E-mail history data. Further, the receiving date and time are a date and a time when receiving the E-mail. The sender E-mail address is an address of a sender of the E-mail.

FIG. 16 is the view showing the images on the screen for dialing based on the received E-mail history data. Referring to FIG. 16, a different point from the call receiving history shown in FIG. 11 is that the received E-mail history is displayed on the left screen.

To be specific, the user operates the operation unit 5 to display the received E-mail history. Then, the telephone displays a list of received E-mail histories titled <<<received E-mail history>>> on the display unit 5. The user selects a desired record of history by use of the cursor 15, and presses the decision key 14. Thereupon, a list of telephone numbers of the sender of this E-mail is displayed (on the central screen in FIG. 16). This list is a result of searching the telephone directory database (see FIG. 4), wherein the sender E-mail address of the E-mail received is used as a key. Further, a telephone number list including E-mail addresses may also be displayed (on the right screen in FIG. 16).

Then, the user selects the telephone number or the E-mail address, whereby the user can easily dial the desired telephone number of the telephone or deliver the E-mail to the desired E-mail address as in the second embodiment.

Note that a delivered E-mail history may also be utilized as a substitute for the received E-mail history. In this case, a structure of the data stored in the memory 3 and screen layouts displayed on the display unit 4 are the same as those in FIGS. 15 and 16.

<Example Sorting Telephone Numbers Based on Dialing Counts>

According to the first or second embodiment, when displaying the list of telephone numbers and E-mail addresses held by the caller (sender), the display sequence is not specified (FIGS, 11, 14 and 16). The telephone numbers and the E-mail addresses may be sorted based on dialing counts (including delivering counts) and thus displayed. In this case, the dialing counts (delivering counts) may be recorded in the telephone directory database, and the telephone numbers and the E-mail addresses may be sorted based on the dialing counts (delivering counts) and thus displayed.

FIG. 17 shows the example of the thus structured telephone directory database. Referring to FIG. 17, the telephone numbers and the dialing counts are stored in couples. Further the E-mail addresses and the delivering counts are stored in couples. FIG. 18 shows the display screens on which the telephone numbers and the E-mail addresses are sorted based on the dialing counts (delivering counts).

It can be assumed that the caller (sender) frequently uses the telephone number exhibiting a large dialing count and the E-mail address exhibiting a large delivering count almost everyday. Hence, there increases a probability of being able to get contact with the caller (sender) sooner by dialing the telephone number or delivering the E-mail to the E-mail address, which are sorted as the list in the dialing (delivering) count sequence.

<<Other Modified Examples>>

The discussion in the first embodiment has been focused on the telephone (such as the mobile telephone, the fixed telephone and the PHS) implementing the automatic redialing function. Further, the discussion in the second embodiment has been focused on the telephone implementing the function capable of easily dialing the telephone number or delivering the E-mail when performing the operation other than dialing on the telephone such as displaying the list of call receiving history. The embodiment of the present invention is not, however, limited to the telephone. The present invention can be applied to, e.g., computers such as a personal computer, PDAs (Personal Digital (Data) Assistants) and so on.

For example, if unable to deliver in the case of sending the E-mail (such as the address being unknown due to an address change and so forth), the automatic redialing function may be executed. Namely, the computer may retain the same architecture as the telephone directory database shown in FIG. 4, and may display a list of other E-mail addresses and telephone numbers held by the receiver to whom the E-mail can not be delivered. When the user selects a desired destination from the list of destinations (E-mail addresses and telephone numbers) displayed, the scheme is that the interface transits to a screen for creating an E-mail addressed to this selected destination, and the E-mail can be immediately delivered.

In this case, the E-mail automatic redelivery function may be automatically executed based on a judgement of the program installed into the computer and executed by the computer detecting an operation based on a judgement of the user.

Similarly, when performing an operation other than the dialing (delivering) such as displaying the list of call receiving history, a function capable of delivering the E-mail may be executed on the computer such as the PDA and the personal computer in the same procedure as that of the telephone in the second embodiment.

<<Storage Medium Readable By a Machine, Tangible Embodying a Program >>

The program executed by a machine to actualize any one of the functions described above may be recorded on a storage medium readable by the machine. Then, the machine reads and executes the program on this recording medium, whereby that function can be provided. The machine may be a computer or a CPU in a telephone or PDA.

Herein, the storage medium readable by a machine embraces recording mediums capable of storing information such as data, programs, etc. electrically, magnetically, optically and mechanically or by chemical action, which can be all read by the computer. What is demountable out of the machine among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the machine.

<<Data Communication Signal Embodied in Carrier Wave>>

Furthermore, the above program may be stored in the hard disk and the memory of the machine, and downloaded to other machines via communication media. In this case, the program is transmitted as data communication signals embodied in carrier waves via the communication media. Then, the machine downloaded with this program can be made to provide the function described above.

Herein, the communication media may be any one of cable communication mediums such as metallic cables including a coaxial cable and a twisted pair cable, optical communication cables, or wireless communication media such as satellite communications, ground wave wireless communications, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be any one of a modulated broad band signal and an unmodulated base band signal (corresponding to a case of setting a DC signal having a voltage of 0 as a carrier wave).

What is claimed is:

1. A communication device implementing a retransmitting function via a network, comprising:

an operation unit detecting an input operation;

a communication module starting a transmission to a destination specified by the input operation using a first piece of destination specifying information to attempt to establish a communication;

a storage unit storing plural pieces of destination specifying information corresponding to every destination, said storage unit storing one or more telephone numbers or E-mail addresses as the destination specifying information on every destination;

a built-in self timer measuring a calling time after starting the transmission, without receiving time information from the network;

a searching module searching and retrieving one or more pieces of destination specifying information, other than the first piece of destination specifying information, stored corresponding to the destination in said storage unit if the calling time equals a predetermined time, while continuing the transmission to attempt to establish the communication based on the first destination specifying information after the calling time has equaled the predetermined time;

a display unit displaying a list of the retrieved one or more destination specifying information, said display unit displaying the searched telephone number or E-mail address;

a selection module for selecting a second piece of destination specifying information from the displayed list of the retrieved one or more destination specifying information, said selection module accepts a selection of the telephone number or E-mail address;

a retransmitting module interrupting the transmission based on the first destination and retransmitting based on the second destination specifying information; and a screen control module making a screen, when the E-mail address is selected on said selection module, transit to an E-mail creating screen for creating an E-mail addressed to this selected E-mail address.

2. A communication device implementing a retransmitting function according to claim 1, wherein if an answer to the transmission is an on-speech signal in a communication that occurred due to other transmission, the communication can not be attained.

3. A communication device implementing a retransmitting function according to claim 1, further comprising a key accepting a request for retransmitting, wherein when said key is pressed in the communication state occurred due to the transmission of said communication module, the communication can not be attained and the communication state is cancelled.

4. A communication device implementing a retransmitting function according to claim 1, wherein said storage unit stores a transmission count for every piece of destination specifying information, and said display unit displays a list of the destination specifying information sorted based on the transmission counts.

5. A storage medium readable by a machine, tangible embodying a program of instructions executable by the machine to perform a method comprising:

starting a transmission to a specified destination information to attempt to establish a communication;

measuring a calling time after starting the transmission by the machine, without receiving time information from outside;

searching and retrieving one or more pieces of destination specifying information other than the first piece of destination specifying information and stored corresponding to the destination if the calling time equals a predetermined time elapsed, while continuing to attempt to attain communication using the first piece of destination specifying information after the calling time has equaled the predetermined time, said searching and retrieving including searching and retrieving one or more telephone numbers or E-mail addresses as the destination specifying information;

displaying a list of the retrieved one or more pieces of destination specifying information, including displaying the retrieved one or more telephone numbers oe E-mail addresses;

selecting a second piece of destination specifying information from the displayed list, and accepting a selection of one of the displayed telephone numbers or E-mail addresess;

making a screen transit to an E-mail creating screen for creating an E-mail addressed to a selected E-mail address, when the second piece of information is the selected E-mail; and interrupting the transmission using the first piece of destination specifying information and retransmitting based on the second piece of destination specifying information.

6. A storage medium readable by a machine, tangible embodying a program of instructions executable by the machine according to claim 5, wherein if an answer to the transmission is an on-speech signal in a communication occurred due to other transmission, the communication can not be attained.

7. A storage medium readable by a machine, tangible embodying a program of instructions executable by the machine according to claim 5, wherein when accepting a predetermined operation in the communication state occurred based on the start of the transmission, the communication can not be attained and the communication state is cancelled.

8. A storage medium readable by a machine, tangible embodying a program of instructions executable by the machine according to claim 5, further comprising:

storing a transmission count for every piece of destination specifying information; and sorting the destination specifying information on the basis of the transmission counts, wherein said display involves displaying a list of the destination specifying information sorted based on the transmission counts.

9. A communication method performed by a device connected to a network, comprising:

starting a transmission to a specified destination;

measuring a calling time after starting the transmission without receiving time information from outside the device;

searching and retrieving one or more pieces of destination specifying information other than the first piece of destination specifying information stored corresponding to the specified destination if a predetermined time elapsed while continuing to attempt attaining communication using the first piece of destination specifying information after the predetermined time elapsed, said searching and retrieving including searching one or more telephone numbers or E-mail addressed as the destination specifying information;

displaying a list of the retrieved one or more pieces destination specifying information including telephone numbers and E-mail addresses;

selecting a second piece of destination specifying information from the destination specifying information displayed and accepting a selected telephone number oe E-mail address;

making a screen transit to an E-mail creating screen for creating an E-mail addressed to a selected E-mail address, when the second piece of information is the selected E-mail address; and interrupting the transmission based on the first piece of destination specifying information and retransmitting based on the second piece of destination specifying information.

10. A communication method according to claim 9, wherein if an answer to the transmission is an on-speech signal in a communication occurred due to other transmission, the communication can not be attained.

11. A communication method according to claim 9, wherein when accepting a predetermined operation in the communication state occurred based on the start of the transmission, the communication can not be attained and the communication state is cancelled.

12. A communication method according to claim 9, further comprising:

storing a transmission count for every piece of destination specifying information; and sorting the destination specifying information on the basis of the transmission counts, wherein said displaying involves displaying a list of the destination specifying information sorted based on the transmission counts.

* * * * *

UNITED STATES PATENT AND TRADEMARK OFFICE
CERTIFICATE OF CORRECTION

PATENT NO. : 7,441,034 B2  Page 1 of 1
APPLICATION NO. : 10/102677
DATED : October 21, 2008
INVENTOR(S) : Masaru Tsurusaki et al.

It is certified that error appears in the above-identified patent and that said Letters Patent is hereby corrected as shown below:

Column 20, Line 10, change "oe" to --or--.

Column 20, Line 15, change "addresess;" to --addresses;--.

Column 20, Line 60, change "addressed" to --addresses--.

Column 21, Line 3, change "oe" to --or--.

Signed and Sealed this

Twenty-seventh Day of January, 2009

JOHN DOLL
*Acting Director of the United States Patent and Trademark Office*